US012633188B2

(12) United States Patent

Tagashira et al.

(10) Patent No.: US 12,633,188 B2
(45) Date of Patent: May 19, 2026

(54) MONEY HANDLING METHOD AND MONEY HANDLING SYSTEM

(71) Applicant: Glory Ltd., Himeji (JP)

(72) Inventors: Kenichi Tagashira, Himeji (JP); Kazuhiro Doi, Himeji (JP); Atsushi Yukawa, Himeji (JP); Ryuji Kataoka, Himeji (JP)

(73) Assignee: GLORY LTD., Himeji (JP)

( * ) Notice: Subject to any disclaimer, the term of this patent is extended or adjusted under 35 U.S.C. 154(b) by 809 days.

(21) Appl. No.: 17/578,497

(22) Filed: Jan. 19, 2022

(65) Prior Publication Data

US 2022/0230502 A1 Jul. 21, 2022

(30) Foreign Application Priority Data

Jan. 19, 2021 (JP) ................................ 2021-006724

(51) Int. Cl.
*G07D 11/25* (2019.01)
*G07D 11/16* (2019.01)
(Continued)

(52) U.S. Cl.
CPC ............ *G07D 11/25* (2019.01); *G07D 11/16* (2019.01); *G07D 11/245* (2019.01); *G07D 11/34* (2019.01);
(Continued)

(58) Field of Classification Search
CPC ...... G07D 11/25; G07D 11/16; G07D 11/245; G07D 11/34; G07D 11/60; G07D 9/00;
(Continued)

(56) References Cited

U.S. PATENT DOCUMENTS 6,014,649 A 1/2000 Kobayashi et al.
6,999,081 B1 * 2/2006 Lin ...................... G06Q 10/00 345/440.2
(Continued)

FOREIGN PATENT DOCUMENTS

JP 2010-015272 A 1/2010
JP 2012-113490 A 6/2012
(Continued)

OTHER PUBLICATIONS

Extended European Search Report issued Jun. 23, 2022 in European Patent Application No. 22151763.4, 8 pages.
(Continued)

*Primary Examiner* — Jeffrey A Shapiro
(74) *Attorney, Agent, or Firm* — XSENSUS LLP

(57) ABSTRACT

A money handling method, which is performed by an information processing apparatus in a money handling system including a plurality of money handling apparatuses and the information processing apparatus, includes: determining a denomination and quantity of money to be moved between the respective money handling apparatuses; performing a simulation, based on the determined denomination and quantity of money, money handling processes to be performed for moving the money between the plurality of apparatuses; performing a determination, based on a result of the simulation, whether or not all the money can be moved between the respective apparatuses; and notifying a result of the determination.

18 Claims, 11 Drawing Sheets

(51) Int. Cl.

| | |
|---|---|
| ***G07D 11/245*** | (2019.01) |
| ***G07D 11/34*** | (2019.01) |
| ***G07D 11/60*** | (2019.01) |
| *G07D 9/00* | (2006.01) |

(52) U.S. Cl.
CPC ............... *G07D 11/60* (2019.01); *G07D 9/00* (2013.01); *G07D 2211/00* (2013.01)

(58) Field of Classification Search
CPC ..... G07D 2211/00; G07F 19/00; G07F 19/20; G07F 19/201; G07F 19/202; G07F 19/203; G07F 19/204; G07F 19/205; G07F 19/2055; G07F 19/206; G07F 19/207; G07F 19/208; G07F 19/209; G07F 19/21; G07F 19/211
See application file for complete search history.

(56) References Cited

U.S. PATENT DOCUMENTS

| | | | | | |
|---|---|---|---|---|---|
| 7,946,474 | B1 * | 5/2011 | Agrawal | G07F 9/026 705/28 |
| 10,223,663 | B2 * | 3/2019 | Cash | G06Q 10/067 |
| 10,395,199 | B1 * | 8/2019 | Gibson | G06Q 10/04 |
| 10,748,095 | B2 * | 8/2020 | Diao | G06Q 20/1085 |
| 2009/0101723 | A1 * | 4/2009 | Uehara | G07G 1/14 235/7 A |
| 2010/0082355 | A1 * | 4/2010 | Folk | G06Q 30/0202 705/7.31 |
| 2011/0137431 | A1 * | 6/2011 | Doi | G07D 11/40 700/75 |
| 2012/0109791 | A1 * | 5/2012 | Cash | G06Q 40/12 705/30 |
| 2013/0001041 | A1 | 1/2013 | Doi et al. | |
| 2014/0072696 | A1 * | 3/2014 | Nomura | G07D 11/125 118/712 |
| 2014/0124573 | A1 | 5/2014 | Doi et al. | |
| 2014/0353375 | A1 * | 12/2014 | Turocy | G06K 19/07779 235/379 |
| 2016/0238435 | A1 * | 8/2016 | Mcphail | G01G 23/01 |
| 2016/0321854 | A1 * | 11/2016 | Mizumoto | G07D 11/50 |
| 2017/0308835 | A1 * | 10/2017 | Diao | G06Q 20/1085 |
| 2018/0293649 | A1 * | 10/2018 | Morgan | G06Q 10/08 |
| 2018/0330563 | A1 * | 11/2018 | Yuasa | G07F 19/20 |
| 2019/0034842 | A1 * | 1/2019 | Cash | G07F 19/206 |
| 2020/0273280 | A1 * | 8/2020 | Chen | G07D 9/00 |
| 2022/0237639 | A1 * | 7/2022 | Costilla | G06Q 30/0205 |
| 2023/0222474 | A1 * | 7/2023 | Tagashira | G06Q 20/20 705/16 |

FOREIGN PATENT DOCUMENTS

| | | | |
|---|---|---|---|
| JP | 2013-008209 | A | 1/2013 |
| JP | 2013-12056 | A | 1/2013 |
| JP | 2016-164734 | A | 9/2016 |
| JP | 2017-162206 | A | 9/2017 |
| JP | 2018-120426 | A | 8/2018 |
| WO | 2010/018626 | A1 | 2/2010 |

OTHER PUBLICATIONS

Office Action issued Jul. 30, 2024 in Japanese Patent Application No. 2021-006724 with machine English translation.

Japanese Office Action issued Oct. 22, 2024 in corresponding Japanese Patent Application No. 2021-006724, 10 pages.

* cited by examiner

FIG.4

| APPARATUS TYPE | GROUP | APPARATUS NUMBER | STORAGE UNIT NUMBER | FULL QUANTITY | DENOMINATION | QUANTITY OF CHANGE FUND | CURRENT QUANTITY | REPLENISHMENT THRESHOLD | COLLECTION THRESHOLD |
|---|---|---|---|---|---|---|---|---|---|
| FRONT APPARATUS | A | F001 | 01 | 1250 | 5€ | 500 | 550 | 100 | 800 |
| | | | 02 | … | | | | | |
| | | | ⋮ | | | | | | |
| | | | CST-01 | 500 | 5€ | — | 0 | — | — |
| | | | | | ⋮ | | | | |
| | | | ⋮ | | | | | | |
| | | | COL-01 | 1000 | 5€ | — | 8 | — | — |
| | | | | | ⋮ | | | | |
| | | | ⋮ | | | | | | |
| | A | F002 | … | | | | | | |
| | ⋮ | | | | | | | | |
| BACK APPARATUS | A | R001 | … | | | | | | |
| | B | R002 | … | | | | | | |
| | ⋮ | | | | | | | | |

MONEY HANDLING METHOD AND MONEY HANDLING SYSTEM

CROSS-REFERENCE TO RELATED APPLICATION

The present application claims priority to, Japanese Patent Application No. 2021-006724, filed Jan. 19, 2021, the entire contents of which being incorporated herein by reference.

TECHNICAL FIELD

The present disclosure relates to a money handling method and a money handling system for moving money between a plurality of money handling apparatuses.

BACKGROUND ART

A plurality of money handling apparatuses are used in a store where transactions with customers are performed. Japanese Laid-Open Patent Publication No. 2013-12056 discloses two types of money handling apparatuses, one is called a settlement apparatus while the other is called a cash recycling apparatus, for example. The settlement apparatus is used for settlement in which a customer pays money corresponding to item prices when a transaction for purchasing the items is made between the store and a customer. The cash recycling apparatus is used for managing cash in the store. A store clerk can collect money from the settlement apparatus and deposit the money into the cash recycling apparatus. The clerk can replenish the settlement apparatus with money dispensed from the cash recycling apparatus.

SUMMARY

In the above conventional art, when the clerk collects money from a plurality of settlement apparatuses almost simultaneously and deposits the collected money into the cash recycling apparatus, a storage unit in the cash recycling apparatus may be filled with money before completing the depositing of the collected money. A shortage of money in the cash recycling apparatus may occur while the clerk dispenses money from the cash recycling apparatus to replenish the plurality of settlement apparatuses with the dispensed money. When a money handling apparatus becomes full or short of money while handling money, the money handling apparatus cannot continue the money handling. When the money handling apparatus stops handling of money during the work of moving money between the plurality of money handling apparatuses, it causes interruption of the work and requires additional work to restore the stopped apparatus.

The present disclosure is made in view of the conventional art having the above problem. The present disclosure addresses the problems, as discussed herein, with a money handling method and a money handling system capable of facilitating work of moving money between a plurality of money handling apparatuses.

A money handling method according to one aspect of the present disclosure is a method performed by an information processing apparatus in a money handling system including a plurality of money handling apparatuses and the information processing apparatus. The money handling method includes: determining a denomination and quantity of money to be moved between the plurality of money handling apparatuses; performing a simulation, based on the determined denomination and quantity of money, money handling processes to be performed for moving the money between the respective apparatuses; performing a determination, based on a result of the simulation, whether or not all the money can be moved between the respective apparatuses; and notifying a result of the determination. The objects, features, advantages and technical and industrial significance of this disclosure will be better understood by the following description and the accompanying drawings of the disclosure.

BRIEF DESCRIPTION OF THE DRAWINGS

FIG. 4 shows an example of apparatus information;

DESCRIPTION OF EMBODIMENTS

Hereinafter, a money handling method and a money handling system according to the present disclosure will be described with reference to the accompanying drawings. Although where and by whom the money handling method and the money handling system are used are not particularly limited, the present disclosure will be described for an example in which the method and the system are used in a store that sells items to customers. In the present embodiment, money may refer to banknote(s) and/or coin(s).

Figure 1:
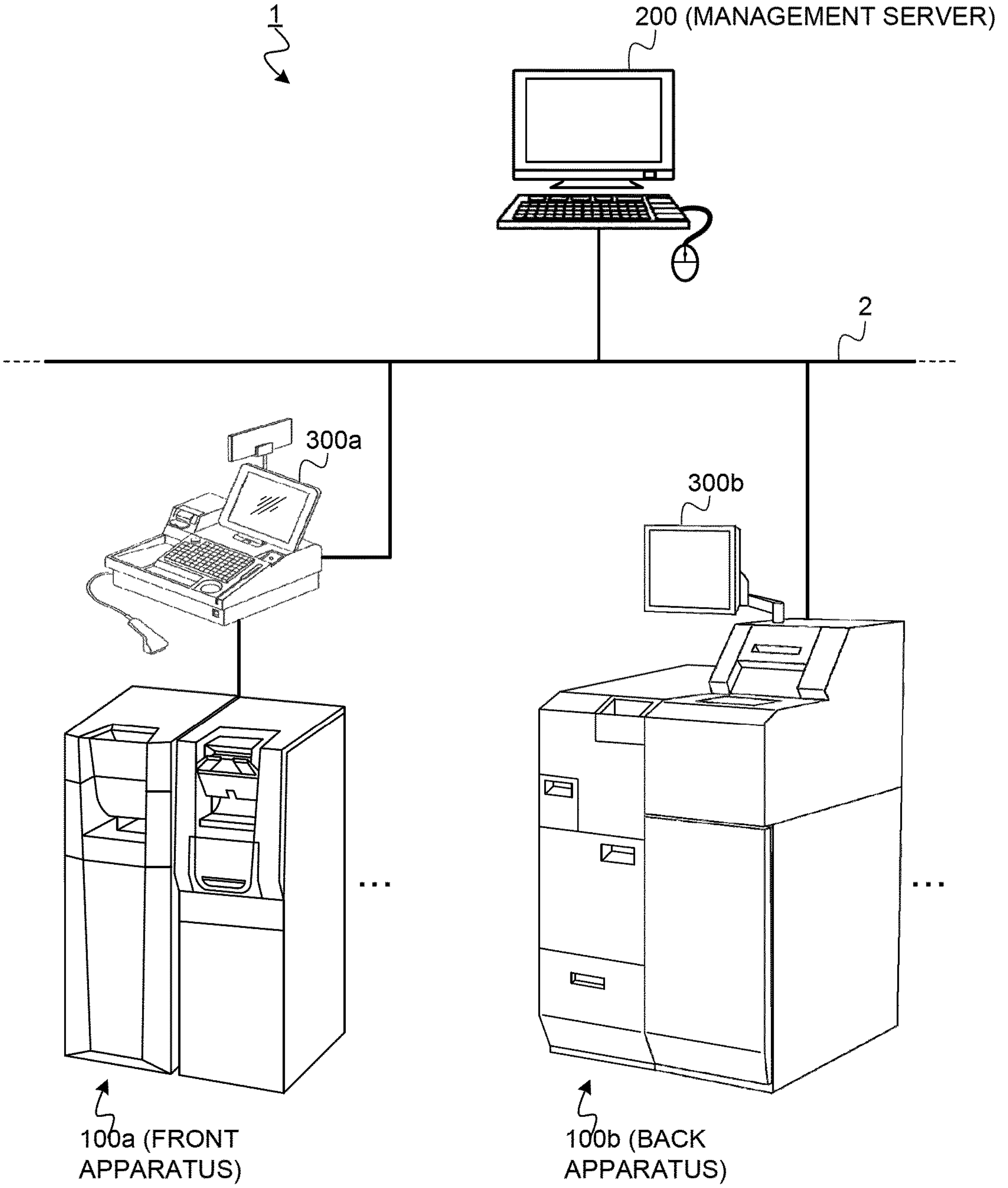
FIG. 1 shows an example of a configuration of a money handling system according to an embodiment of the present disclosure.

FIG. 1 shows an example of a configuration of a money handling system 1 according to one or more aspects of the present disclosure. As shown in FIG. 1, the money handling system 1 includes a plurality of money handling apparatuses 100 (100*a*, 100*b*) and a management server 200 (information processing apparatus) for managing the money handling apparatuses 100.

The management server 200 is communicably connected to each money handling apparatus 100 via a network 2. Each money handling apparatus 100 can perform a depositing process of receiving money from outside the apparatus and storing the received money inside the apparatus, and/or a dispensing process of discharging the money to outside the apparatus from inside the apparatus. The number of money handling apparatuses 100 included in the money handling system 1 is not particularly limited.

Figure 2:
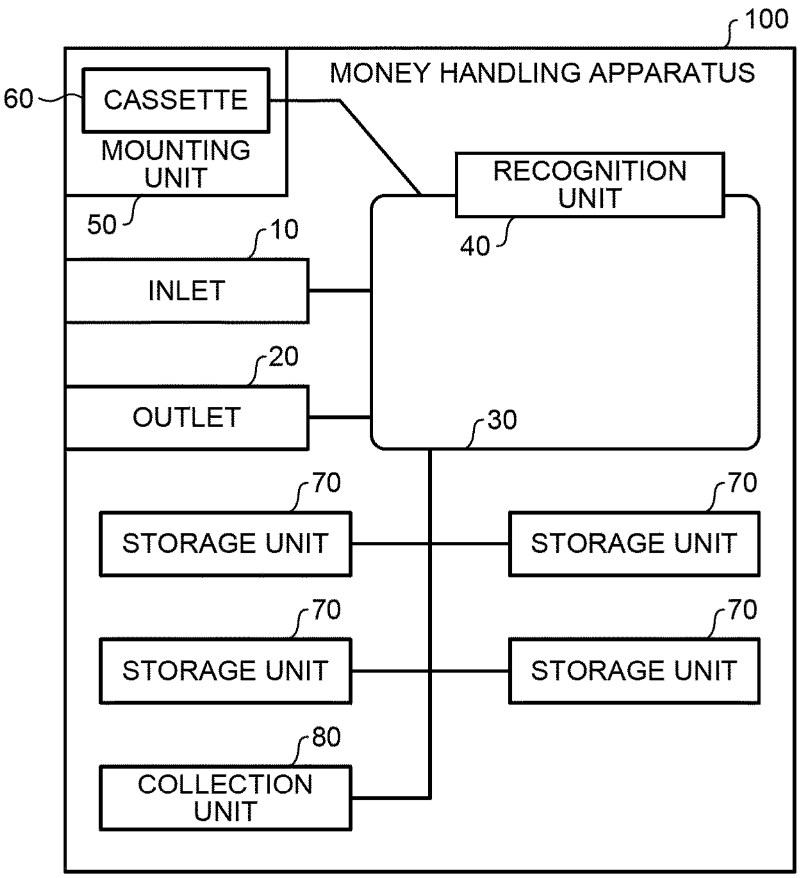
FIG. 2 shows an example of a configuration of a money handling apparatus.

FIG. 2 shows an example of a configuration of the money handling apparatus 100. The money handling apparatus 100 includes an inlet 10, an outlet 20, a transport unit 30, a recognition unit 40, and storage units 70. The inlet 10 and the outlet 20 may be disposed in one opening formed on an apparatus housing, or may be disposed in different openings. As shown in FIG. 2, the money handling apparatus 100 may further include a collection unit 80, and a mounting unit 50 to/from which a cassette 60 is mounted/dismounted. These components which are controlled by a control unit 110 shown in FIG. 3 allow various money handling processes such as a depositing process, a dispensing process, a collection process, and a replenishment process that can be performed in the money handling apparatus 100.

In the depositing process, the money handling apparatus 100 receives, through the inlet 10, money to be deposited in the apparatus. The money received in the inlet 10 is fed into the apparatus one by one and transported by the transport unit 30. When the money handling apparatus 100 includes the mounting unit 50, money to be deposited may be received from the cassette 60. In this case, money stored in the cassette 60 mounted to the mounting unit 50 is fed out into the apparatus one by one and transported by the transport unit 30. The money being transported by the transport unit 30 is recognized by the recognition unit 40 and stored in any of the storage units 70.

The recognition unit 40 can recognize the denomination and authenticity of money. The recognition unit 40 may further recognize the fitness of money. The control unit 110 can calculate the quantity and amount of money for each kind, the total quantity of money, and the total amount of money.

A store clerk can assign the kinds of money to be stored in the storage units 70. For example, when the clerk sets information on a kind of money to be stored in the respective storage units 70, the set information is stored in a memory 140 shown in FIG. 3. When the kinds of money to be stored in the respective storage units 70 have been set, each kind of money is stored in the corresponding storage unit 70, based on recognition result obtained by using the recognition unit 40. For example, money is stored in the plurality of storage units 70 by denomination. Although FIG. 2 shows four storage units 70, the number of storage units 70 in each money handling apparatus 100 is not particularly limited.

When the money handling apparatus 100 includes the collection unit 80, the collection unit 80 can be used for storing money that is not stored in the storage units 70. For example, money of a kind not assigned to any of the storage units 70 is stored in the collection unit 80. For another example, if there is a storage unit 70 that has become full of money, money that cannot be stored in the storage unit 70 is stored in the collection unit 80. When the money handling apparatus 100 does not include the collection unit 80, the money of the kind not assigned to any of the storage units 70 and the money that cannot be stored in the storage units 70 may be returned from the outlet 20.

In the dispensing process, the money handling apparatus 100 feeds out, from the storage units 70, money to be dispensed, and transports the money to the outlet 20. When the money handling apparatus 100 includes the mounting unit 50, money to be dispensed may be fed out from the storage unit 70 and transported to the cassette 60 mounted to the mounting unit 50. The money fed out from the storage unit 70 is transported by the transport unit 30 one by one. The money being transported by the transport unit 30 may be recognized by the recognition unit 40. When dispensing money by using the outlet 20, the money transported by the transport unit 30 is discharged to outside the apparatus from the outlet 20. When dispensing money by using the cassette 60, the money transported by the transport unit 30 is stored in the cassette 60.

In the collection process of collecting money from the money handling apparatus 100, the money handling apparatus 100 feeds out, from the storage units 70, money to be collected, and transports the money to the outlet 20. When the money handling apparatus 100 includes the mounting unit 50, money to be collected may be fed out from the storage unit 70 and transported to the cassette 60 mounted to the mounting unit 50. The money fed out from the storage unit 70 is transported by the transport unit 30 one by one. The money being transported by the transport unit 30 may be recognized by the recognition unit 40. When collecting money by using the outlet 20, the money transported by the transport unit 30 is discharged through the outlet 20. When collecting money by using the cassette 60, the money transported by the transport unit 30 is stored in the cassette 60.

In the replenishment process of replenishing the money handling apparatus 100 with money, the money handling apparatus 100 receives money for replenishment from the inlet 10. When the money handling apparatus 100 includes the mounting unit 50, money for replenishment may be received from the cassette 60 mounted to the mounting unit 50. When the inlet 10 is used for the replenishment process, money for replenishment received in the inlet 10 is fed out one by one into the apparatus, transported by the transport unit 30, recognized by the recognition unit 40, and stored in a storage unit 70 corresponding to the kind of the money, based on the recognition result. When the cassette 60 is used for the replenishment process, money for replenishment stored in the cassette 60 is fed out one by one into the apparatus, transported by the transport unit 30, recognized by the recognition unit 40, and stored in a storage unit 70 corresponding to the kind of the money, based on the recognition result.

When money is to be moved between a plurality of money handling apparatuses 100 in order to perform replenishment or collection of money, the clerk can operate the money handling apparatus 100, which is a source of the movement of money, to discharge the money through the outlet 20 thereof, and operate the money handling apparatus 100, which is a destination of the movement of the money, to store the money in the storage unit 20 through the inlet 10 thereof. When each money handling apparatus 100 includes the mounting unit 50, the clerk can use the cassette 60 for the movement of money. Specifically, the clerk stores the money to be moved, into the cassette 60 mounted to the money handling apparatus 100 that is the source of money. The clerk dismounts the cassette 60 from the source apparatus 100 The clerk carries the cassette 60 to the money handling apparatus 100 that is the destination of money stored in the cassette 60. The clerk mounts the cassette 60 to the mounting unit 50 of the destination apparatus 100, and stores the money from the cassette 60 into the storage unit 70 in the destination apparatus 100. In the following description, the money handling apparatus 100 as the source of money may be referred to as a first apparatus while the money handling apparatus 100 as the destination of money may be referred to as a second apparatus so as to distinguish them.

Figure 3:
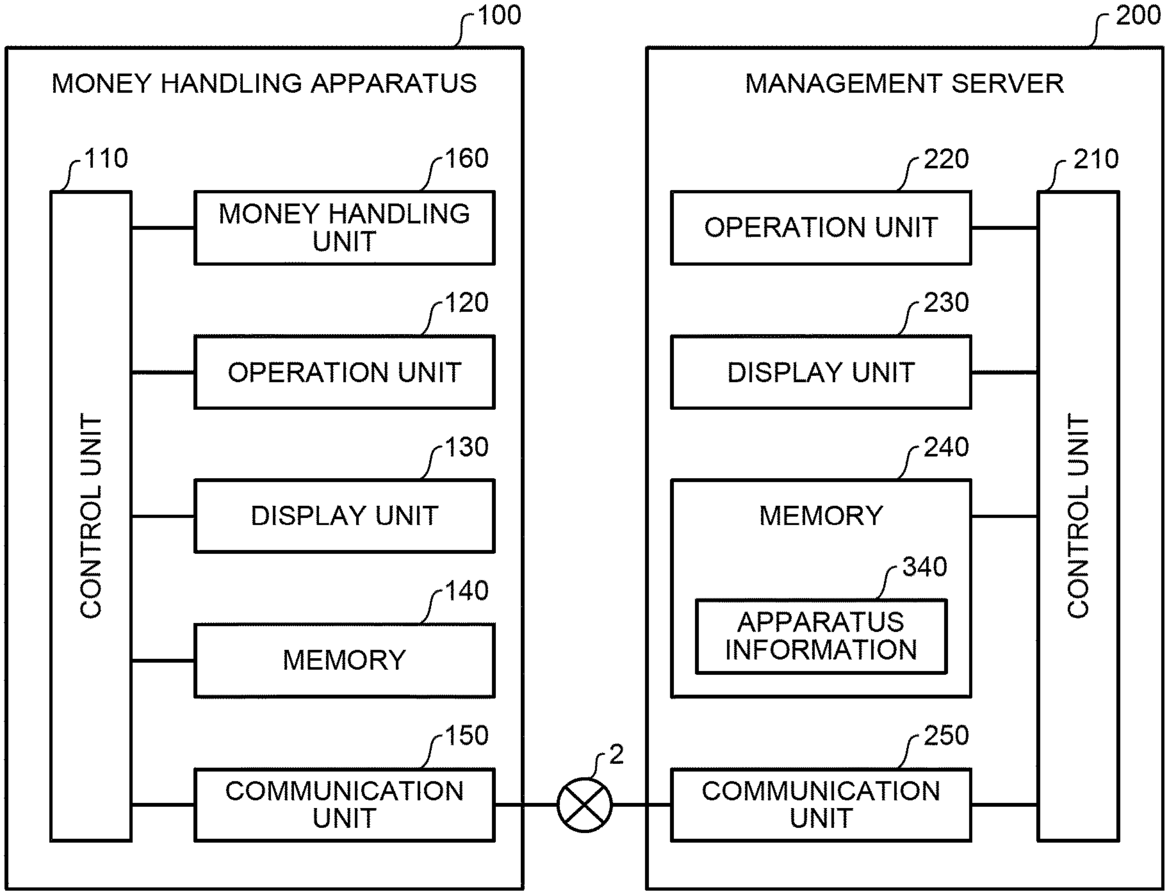
FIG. 3 is a block diagram schematically showing a functional configuration of the money handling system.

FIG. 3 is a block diagram schematically showing a functional configuration of the money handling system 1. Since the respective money handling apparatuses 100 have the same configuration, FIG. 3 shows one money handling apparatus 100. The money handling apparatus 100 includes a control unit 110, an operation unit 120, a display unit 130, a memory 140, and a communication unit 150 in addition to a money handling unit 160 including the components described in FIG. 2.

The operation unit 120 is used for inputting various kinds of information on money handling. The display unit 130 is used for displaying various kinds of information on money handling. The operation unit 120 and the display unit 130 may be disposed independently from the money handling apparatus 100. An external device communicably connected to the communication unit 150 of the money handling apparatus 100 may serve as the operation unit 120 and the display unit 130. The operation unit 120 and the display unit 130 may not necessarily be separately disposed, and may be integrated with each other as an operation/display unit.

The memory 140 is a nonvolatile memory device used for storing various kinds of information on money handling. The communication unit 150 is used for transmitting/receiving information to/from the external device. The control unit 110 can control the respective units 120 to 160 while using the information stored in the memory 140, based on information inputted to the operation unit 120 and/or information received by the communication unit 150. The control unit 110 can control these units to realize functions and operations of the money handling apparatus 100 described in the present embodiment. In an exemplary implementation, control unit 110 is encompassed by or may include processing circuitry which will be discussed later with respect to FIG. 11.

The money handling system 1 may include different types of money handling apparatuses 100. FIG. 1 shows an example in which the money handling system 1 includes two types of money handling apparatuses 100*a* and 100*b*. The money handling apparatus 100*a* is used for settlement at the time of transaction with a customer. The money handling apparatus 100*a* is installed at a checkout counter in a checkout area, which is called a front area, of the store, for example. The money handling apparatus 100*a* is connected to a terminal device 300*a* as an external device. An operation unit and a display unit of the terminal device 300*a* also function as the operation unit 120 and the display unit 130 of the money handling apparatus 100*a*. The terminal device 300*a* is a POS (Point of Sales) register connected to a POS system, for example. The terminal device 300*a* and the front apparatus 100*a* are used for settlement in which the customer pays money corresponding to item prices for purchasing the items in the store.

The money handling apparatus 100*b* shown in FIG. 1 is used for depositing of money collected from the money handling apparatus 100*a* and dispensing of money for replenishing the money handling apparatus 100*a*. The money handling apparatus 100*b* is installed in an office, which is called a back office, of the store, for example. Since collection and replenishment of money are performed on a plurality of money handling apparatuses 100*a*, the money handling apparatus 100*b* is configured such that a greater quantity of money can be deposited/dispensed therein/therefrom, as compared to the money handling apparatus 100*a*. The money handling apparatus 100*b* includes an operation/display unit 300*b* that is a touch-panel type liquid crystal display device. The operation/display unit 300*b* functions as the operation unit 120 and the display unit 130 of the money handling apparatus 100*b*.

Hereinafter, the money handling apparatus 100*a* installed in the front area of the store where settlement is performed is referred to as a front apparatus 100*a* while the money handling apparatus 100*b* installed in the back office of the store is referred to as a back apparatus 100*b* so as to distinguish them. When describing for both apparatuses 100*a* and 100*b*, these apparatuses may be referred to as money handling apparatuses 100. Although FIG. 1 shows one front apparatus 100*a*, the money handling system 1 includes a plurality of front apparatuses 100*a*. The money handling system 1 may include a plurality of back apparatuses 100*b*.

As shown in FIG. 3, the management server 200 is an information processing apparatus including a control unit 210, an operation unit 220, a display unit 230, a memory 240, and a communication unit 250. For example, a computer device is used as the management server 200.

The operation unit 220 is used for inputting various kinds of information on money handling to be performed in the money handling apparatus 100. The display unit 230 is used for displaying various kinds of information on money handling to be performed in the money handling apparatus 100. An external device communicably connected to the communication unit 250 of the management server 200 may serve as the operation unit 220 and the display unit 230. The operation unit 220 and the display unit 230 may not necessarily be separately disposed, and may be integrated as an operation/display unit.

The memory 240 is a nonvolatile memory device for storing various kinds of information on the money handling. The communication unit 250 is used for transmitting/receiving information to/from the external device. The control unit 210 can control the respective units 220 to 250 while using the information stored in the memory 240, based on information inputted to the operation unit 220 and/or information received by the communication unit 250. The control unit 210 can control these units to realize the functions and operations of the management server 200 described in the present embodiment. In an exemplary implementation, control unit 210 is encompassed by or may include processing circuitry which will be discussed later with respect to FIG. 11.

As shown in FIG. 3, apparatus information 340 is stored in the memory 240 of the management server 200. The apparatus information 340 includes pieces of information on the respective money handling apparatuses 100. The management server 200 can perform a simulation regarding movement of money to be performed between the plurality of money handling apparatuses 100, based on the apparatus information 340.

FIG. 4 shows an example of the apparatus information 340. As shown in FIG. 4, the management server 200 can manage "apparatus type", "group", "apparatus number", "storage unit number", "full quantity", "denomination", "quantity of change fund", "current quantity", "replenishment threshold", and "collection threshold", by using the apparatus information 340.

The apparatus information 340 shown in FIG. 4 is an example. The apparatus information 340 may not necessarily include all the pieces of information shown in FIG. 4. For example, the apparatus information 340 may include, instead of "apparatus type" and "apparatus number", other information with which the respective money handling apparatuses 100 can be distinguished from each other. If the money handling apparatuses 100 need not be grouped, the apparatus information 340 need not include information of groups. In this case, all the money handling apparatuses 100 registered in the apparatus information 340 are treated as belonging to the same group. FIG. 4 shows a case where there are a plurality of money handling apparatuses 100 whose apparatus types are classified as "back apparatus". However, if the store is small, the number of money handling apparatuses 100 to be classified as "back apparatus" may be one.

The "apparatus type" is information indicating whether each money handling apparatus 100 is a front apparatus 100*a* or a back apparatus 100*b*. The "group" is identification information indicating a group to which each money handling apparatus 100 belongs. The money handling system 1 can group a plurality of money handling apparatuses 100. When group identification information is registered in the column of "group" in the apparatus information 340, the management server 200 can identify a group to which each money handling apparatus 100 belongs. The "apparatus number" is identification information for distinguishing the respective money handling apparatuses 100 from each other. Even when there are a plurality of money handling apparatuses 100 of the same type, the management server 200 can distinguish the respective apparatuses 100 by using the apparatus numbers.

The "storage unit number" is identification information for distinguishing the cassette 60, the storage units 70, and the collection unit 80 included in one money handling apparatus 100. In the example shown in FIG. 4, the plurality of storage units 70 shown in FIG. 2 are managed with serial numbers "01", "02", . . . assigned thereto, the cassette 60 is managed as "CST-01", and the collection unit 80 is managed as "COL-01". Thus, the management server 200 can distinguish the different types of storages, i.e., the cassette 60, the storage unit 70, and the collection unit 80. Even when there are a plurality of components of the same type of storage, serial numbers are assigned to the respective components to individually manage them. If the money handling apparatus 100 does not include the cassette 60 and the collection unit 80, the column of "storage unit number" does not include information on the cassette 60 and the collection unit 80.

The "full quantity" (maximum storage quantity) shown in FIG. 4 is information indicating the storage quantity of money that each component for storing money, such as the storage unit 70, the cassette 60, or the collection unit 80, can store therein. The quantity in this embodiment may be the number of banknotes and/or the number of coins. The "denomination" is information indicating the denomination of money to be stored. The "quantity of change fund" is information indicating the quantity of money to be stored in the apparatus in advance before the store is open, i.e., before business hours of the store. The "current quantity" is information indicating the quantity of money currently stored in the apparatus. When money handling has been performed in the money handling apparatus 100 and thereby the quantity of money stored in any of the cassette 60, the storage unit 70, and the collection unit 80 has changed, related information is transmitted from the money handling apparatus 100 to the management server 200 to update the information of the current quantity. The "replenishment threshold" indicates a threshold at which it is determined that replenishment of money is required. When the information of the current quantity has been updated and the updated current quantity is equal to or smaller than the replenishment threshold, the management server 200 determines that replenishment of money is required for the money handling apparatus 100. The "collection threshold" indicates a threshold at which it is determined that collection of money is required. When the information of the current quantity has been updated and the updated current quantity is equal to or greater than the collection threshold, the management server 200 determines that collection of money is required for the money handling apparatus 100. When it is determined that collection or replenishment of money is required for the money handling apparatus 100, the management server 200 can notify the clerk of this situation. The notification may be performed by displaying information indicating the situation on the display unit 130 of the money handling apparatus 100 and/or the display unit 230 of the management server 200. If the money handling apparatus 100 does not include the cassette 60 and the collection unit 80, the apparatus information 340 does not include information on the quantity of money stored in the cassette 60 and the collection unit 80.

In the example shown in FIG. 4, 1250 banknotes can be stored in a storage unit 70 whose storage unit number is 01 in a front apparatus 100*a* whose apparatus number is F001 and which belongs to a group A. This storage unit 70 is set to store 5-euro notes, and currently stores 550 banknotes therein. When the number of banknotes becomes 100 or less, it is determined that replenishment of this storage unit 70 with banknotes is required. When the number of banknotes becomes 800 or more, it is determined that collection of banknotes from this storage unit 70 is required. The management server 200 can also manage information on the cassette 60, the storage units 70, and the collection unit 80 in each back apparatus 100*b*, similarly to the front apparatus 100*a* by using the apparatus information 340.

Next, movement of money between a front apparatus 100*a* and a back apparatus 100*b* will be described. The clerk can start work of moving money by using any of: the operation unit 120 and the display unit 130 of the front apparatus 100*a*; the operation unit 120 and the display unit 130 of the back apparatus 100*b*; and the operation unit 220 and the display unit 230 of the management server 200. Hereinafter, the description will be continued with the clerk using the operation unit 220 and the display unit 230 of the management server 200.

Figure 5:
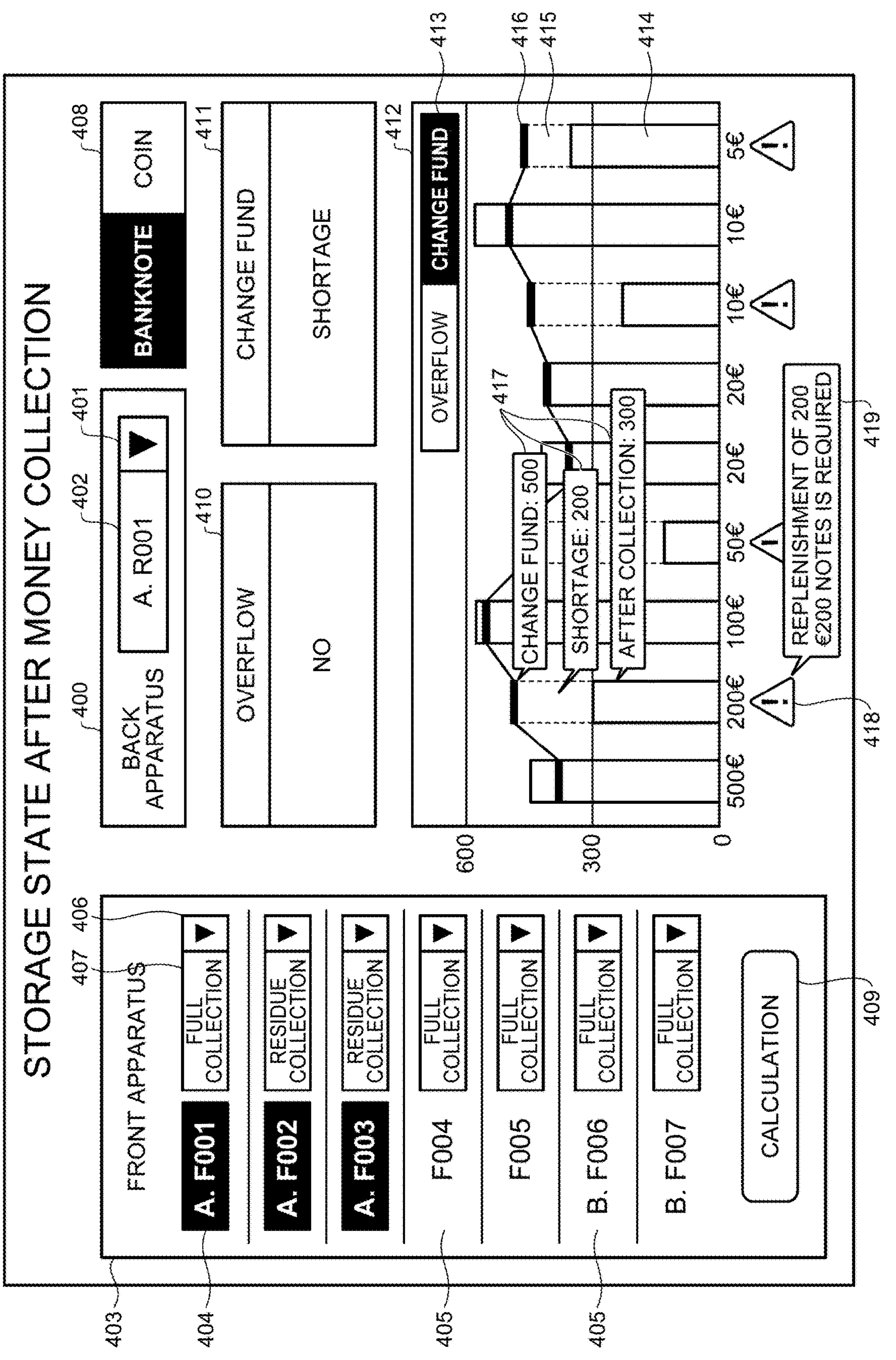
FIG. 5 shows an example of a screen displayed during collection work.

Firstly, collection work in which money is collected from a front apparatus 100*a* (first apparatus) to a back apparatus 100*b* (second apparatus) will be described. In the collection work, money collected from the front apparatus 100*a* is deposited in the back apparatus 100*b*. When the clerk starts the collection work by performing a predetermined operation on the operation unit 220, information on the collection work is displayed on the display unit 230. FIG. 5 shows an example of a screen displayed during the collection work. Before actually moving money, the clerk can confirm how the money storage state of the back apparatus 100*b* changes after moving the money, based on the screen shown in FIG. 5.

When the clerk operates the operation unit 220 and presses a button 401 in a frame 400 that is located in an upper portion of the screen and indicates information on the back apparatus 100*b*, a pull-down list appears on the screen. The pull-down list includes a list of the back apparatuses 100*b* registered in the apparatus information 340 shown in FIG. 4. When the clerk selects a back apparatus 100*b* from the list, identification information 402 of the selected back apparatus 100*b* is displayed in the frame 400. The displayed identification information 402 includes information of the group and the apparatus number registered in the apparatus information 340.

After the back apparatus 100*b* is selected, in a frame 403 that is located on the left side of the screen and indicates information on front apparatuses 100*a*, identification information 404 of front apparatuses 100*a* that belong to the same group as the selected back apparatus 100*b* is displayed in a distinguishable manner from identification information 405 of the other front apparatuses 100*a* that do not belong to the same group. In the example shown in FIG. 5, since the back apparatus 100*b* of the group A is selected, only the identification information 404 of the front apparatuses 100*a* that belong to the group A is highlighted in the frame 403. Each of the identification information 404, 405 of the front apparatuses 100*a* displayed in the frame 403 includes information of the group and the apparatus number registered in the apparatus information 340. When the front apparatus 100*a* does not belong to a group, only the apparatus number is displayed in the frame 403.

In the frame 403, a button 406 for selecting a money collection method is displayed in association with the identification information 404 of each front apparatus 100*a*. When the clerk presses a button 406, a list of selectable money collection methods appears on the screen. The listed collection methods include: "full collection" for collecting all money from all the storage units 70 of the front apparatus 100*a*; and "residue collection" for leaving change fund to be left in each storage unit 70 while collecting money other than the change fund from each storage unit 70. The clerk can select a money collection method for each front apparatus 100*a*. Collection information 407 indicating a money collection method is displayed in association with the identification information 404 of each front apparatus 100*a*.

On the screen shown in FIG. 5, the clerk can select not only a back apparatus 100*b* but also a front apparatus 100*a*. For example, when the clerk operates the operation unit 220 and selects one front apparatus 100*a* in the frame 403 on the left side of the screen, identification information 404 of all the front apparatuses 100*a* that belong to the same group as the selected front apparatus 100*a* is displayed in a distinguishable manner from identification information 405 of the other front apparatuses 100*a*. In addition, identification information 402 of a back apparatus 100*b* that belongs to the same group as the front apparatus 100*a* selected by the clerk is displayed in the frame 400 in the upper portion of the screen.

On the upper right side of the screen, a selection button 408 for selecting money to be collected is displayed. In the example shown in FIG. 5, the selection button 408 for "banknote" is highlighted because the collection target is banknotes. The clerk can change the collection target to coins by operating the operation unit 220 and pressing the selection button 408 for "coin".

In the state where all the front apparatuses 100*a* and the back apparatus 100*b* that belong to the same group are selected on the screen of the display unit 230, the clerk presses a calculation button 409 located on the lower left side of the screen. If there is only one back apparatus 100*b* in the store, the button 401 for selecting a back apparatus 100*b* is not displayed in the frame 400 in the upper portion of the screen. For example, if the apparatus information 340 includes only one group including one back apparatus 100*b* and a plurality of front apparatuses 100*a*, an initial screen showing a state where identification information 402 of this back apparatus 100*b* is displayed on the screen and all the front apparatuses 100*a* are selected. A similar initial screen is displayed also when the apparatus information 340 does not include the column of "group". In these cases, the clerk presses the calculation button 409 after confirming the information on the initial screen.

When the calculation button 409 has been pressed, the management server 200 simulates movement of money between the front apparatuses 100*a* and the back apparatus 100*b*, based on the information on the front apparatuses 100*a*, the information on the back apparatus 100*b*, and the money collection method which are selected on the screen.

As for the front apparatus 100*a* for which the money collection method of "full collection" has been selected on the screen shown in FIG. 5, the management server 200 recognizes that all the money stored in the storage units 70 of this front apparatus 100*a* should be collected and deposited in the back apparatus 100*b*. The money to be moved between the front apparatus 100*a* and the back apparatus 100*b* is identified based on the apparatus information 340. Meanwhile, as for the front apparatus 100*a* for which the money collection method of "residue collection" has been selected, the management server 200 recognizes that money equivalent to the quantity of change fund, out of money being stored in each storage unit 70, should be left therein and the remaining money should be collected therefrom. The money to be moved between each front apparatus 100*a* and the back apparatus 100*b* and the money to be left in each front apparatus 100*a* are identified based on the apparatus information 340. For example, as for the storage unit 70 of which the storage unit number is 01 and which is included in the front machine 100*a* of which the apparatus number is F001 shown in FIG. 4, all the 550 5-euro notes shown in the column of "current quantity" are collected in the case of "full collection", whereas 50 5-euro notes are collected while leaving 500 5-euro notes equivalent to the quantity shown in the column of "quantity of change fund", in the case of "residue collection".

The options of the money collection method, which can be selected by the clerk, may include "designated collection" in which the clerk designates money to be collected. When "designated collection" is selected, another screen is displayed. On this screen, the clerk can manually designate the denominations and the quantity for each denomination of money to be collected from the front machine 100*a*. In this case, the management server 200 recognizes that the money designated by the clerk should be collected from the front apparatus 100*a* and deposited into the back apparatus 100*b*. The options of the money collection method may include one, two, or three (i.e., all) of "full collection", "residue collection", and "designated collection".

For all the front apparatuses 100*a* selected on the screen shown in FIG. 5, the management server 200 specifies the denominations and the quantity for each denomination of money to be collected from the front apparatuses 100*a*. That is, the management server 200 specifies the denominations and the quantity for each denomination of money to be deposited in the back apparatus 100*b*. Moreover, the management server 200 specifies, based on the apparatus information 340, the denominations and the quantity for each denomination of money that is currently stored in the respective storage units 70 of the back apparatus 100*b* selected on the screen shown in FIG. 5. The management server 200, by using the specified information, simulates depositing of the money collected from the respective front apparatuses 100*a* into the back apparatus 100*b*. That is, the management server 200 simulates how the money storage states of the respective storage units 70 of the back apparatus 100*b* change when the money is moved from all the front apparatuses 100*a* to the back apparatus 100*b*. The management server 200 displays a simulation result on the screen shown in FIG. 5. The simulation result includes overflow information 410 and change fund information 411.

The overflow information 410 indicates whether or not there is a storage unit 70 in which an overflow will occur in the back apparatus 100*b*, i.e., whether or not there is a storage unit 70 in which the quantity of money will exceed the full quantity, when the money is collected from the front apparatuses 100*a* to the back apparatus 100*b*. As shown in FIG. 5, the management server 200 displays, as the overflow information 410, "NO" when an overflow will not occur in the back apparatus 100*b*, and "YES" when an overflow will occur.

The change fund information 411 indicates whether or not change funds, which will be required in the front apparatuses 100*a* for the next day's business, can be dispensed from the back apparatus 100*b* after money is collected from the front apparatuses 100*a* to the back apparatus 100*b*. As shown in FIG. 4, the management server 200 manages information on change funds that are required, for the next day's business, in the respective storage units 70 of each front apparatus 100*a*. The management server 200 specifies, based on the information on the change funds and the money storage states of the storage units 70 of each front apparatus 100*a* after money collection, the denominations and the quantity for each denomination of money to be dispensed as the change funds from the back apparatus 100*b* before the business hours on the next day. That is, the management server 200 specifies the denominations and the quantity for each denomination of money to be dispensed from the back apparatus 100*b* such that all the front apparatuses 100*a* belonging to the same group as the back apparatus 100*b* can be replenished with the money dispensed from the back apparatus 100*b* and it leads to a state where the change funds shown in the apparatus information 340 are stored in the respective storage units 70 of each front apparatus 100*a*.

In the example shown in FIG. 5, full collection is performed for the front apparatus 100*a* whose apparatus number is F001 such that the storage units 70 thereof are emptied, while residue collection is performed for the front apparatuses 100*a* whose apparatus numbers are F002 and F003 such that change fund required for the next day's business is left in each apparatus even after collecting the money. Therefore, change funds to be stored in the respective storage units 70 of the front apparatus 100*a* whose apparatus number is F001 becomes the change funds to be dispensed from the back apparatus 100*b* before the next day's business hours, for example. When full collection of money is performed for a plurality of front apparatuses 100*a*, the total of change funds to be stored in these front apparatuses 100*a* becomes the change funds to be dispensed from the back apparatus 100*b* before the next day's business hours.

The management server 200 determines whether or not the specified change funds can be dispensed from the back apparatus 100*b* after money is collected from all the front apparatuses 100*a* selected as shown in FIG. 5. If a shortage of money will occur in a storage unit 70 of the back apparatus 100*b* after money collection and therefore not all the change funds can be dispensed, the management server 200 displays "shortage" in the change fund information 411 shown in FIG. 5. Meanwhile, if all the change funds can be dispensed from the back apparatus 100*b* after the money collection, the management server 200 displays "OK" in the change fund information 411.

In a frame 412 located on the lower right side of the screen shown in FIG. 5, information indicating the money storage states in the respective storage units 70 of the back apparatus 100*b* after the money collection is graphically displayed. The clerk can select information to be displayed in the frame 412 by using a selection button 413 located on the upper right side of the frame 412. In the example shown in FIG. 5, since "change fund" is selected, the words for "change fund" are highlighted, and information on change funds is displayed in the frame 412.

A graph having a horizontal axis indicating denomination of money and a vertical axis indicating quantity of money is shown in the frame 412. In the example shown in FIG. 5, the horizontal axis indicates the denominations of banknotes stored in the respective storage units 70 of the back apparatus 100*b*, and the vertical axis indicates the number of banknotes for each denomination assigned to the respective storage units 70.

A bar graph 414 represented by solid lines indicates the quantities of money in the respective storage units 70 of the back apparatus 100*b* after money to be collected from all the front apparatuses 100*a* selected on the screen shown in FIG. 5 is collected and deposited in the back apparatus 100*b*. Thus, before actually collecting the money from the front apparatuses 100*a* into the back apparatus 100*b*, the clerk can confirm how the money storage states of the respective storage units 70 of the back apparatus 100*b* change after the money collection.

A line graph 416 indicates the quantities of money corresponding to the change funds required for the next day's business. The management server 200 specifies the quantities of money required to be stored in the respective storage units 70 of the back apparatus 100*b*, based on the money storage states, after money collection, of all the front machines 100*a* that belong to the same group as the back machine 100*b*, and on the change funds to be prepared in the respective front machines 100*a* before the next day's business hours. Then, the management server 200 represents the quantities of money required to be stored in the respective storage units 70 by using the line graph 416. That is, the line graph 416 represents the quantities of money required in the respective storage units 70 of the back apparatus 100*b* such that all the change funds to be supplied to the front apparatuses 100*a* of the same group can be dispensed from the back apparatus 100*b* before the next day's business hours. Each area 415 represented by broken lines indicates a shortage quantity of money in a storage unit 70 of the back apparatus 100*b* with respect to the quantity of money, which corresponds to the change fund required to be stored therein, represented by the line graph 416.

The clerk can confirm the details of the quantity of money on the screen shown in FIG. 5 by operating the operation unit 220. For example, when the clerk performs, with the operation unit 220, an operation of selecting a denomination displayed on the horizontal axis or a bar corresponding to the denomination, information 417 on the quantity of money of the selected denomination is displayed on the screen. Specifically, the quantity of money in the corresponding storage unit 70 after the money collection, the quantity of change fund required for the next day's business, and a shortage quantity obtained by subtracting the quantity of money in the storage unit 70 from the quantity of change fund, are indicated in numerical values.

FIG. 5 shows an example in which the clerk selects the denomination "200 euro". The clerk can confirm, from the information 417 displayed for the selected denomination "200 euro", that the number of banknotes after the money collection will be 300 in the storage unit 70 used for storing 200-euro notes in the back apparatus 100*b*, and this storage unit 70 will be short by 200 banknotes because the number of 200-euro notes required for the change fund for the next day's business is 500.

A warning icon 418 that notifies the clerk of a denomination for which a shortage of change fund will occur is displayed beneath the denomination on the horizontal axis of the graph. In the example shown in FIG. 5, after the money collection, a shortage of banknotes for change fund will occur in the storage units 70 for storing 5-euro notes, 10-euro notes, 50-euro notes, and 200-euro notes, and therefore, warning icons 418 are displayed beneath these denominations.

When the clerk operates the operation unit 220 and presses a warning icon 418, guidance information for guiding work to be performed by the clerk is displayed. For example, when the clerk presses the warning icon 418 for 200-euro notes, guidance information indicating that the clerk needs to perform additional work of replenishing the back apparatus 100*b* with 200 200-euro notes after the money collection, is displayed as shown in FIG. 5.

In the example shown in FIG. 5, an overflow will not occur. However, if an overflow will occur, the clerk can confirm the states of the respective storage units 70 of the back apparatus 100*b* after the money collection by pressing the selection button 413, located on the upper right side of the frame 412, to select "overflow". When displaying overflow information, the quantities of money in the respective storage units 70 after the money collection are represented by a solid bar graph, and the quantities (full quantities) of money that can be stored in the respective storage units 70 are represented by a line graph. In a bar corresponding to a storage unit 70 in which an overflow will occur, a portion exceeding the full quantity is displayed to be distinguishable from the other portion. The portion exceeding the full quantity is represented by broken lines, for example. Like the change fund information, when the clerk performs an operation of selecting a denomination displayed on the horizontal axis or a bar corresponding to this denomination, the quantity of money in the corresponding storage unit 70 after the money collection, the full quantity of this storage unit 70, and an overflow quantity obtained by subtracting the full quantity from the quantity of money in the storage unit 70, are displayed in numerical values. Moreover, a warning icon is displayed for the storage unit 70 in which an overflow will occur, so that the clerk can easily recognize the storage unit 70 and the denomination for which an overflow will occur. When the clerk presses the warning icon, guidance information for guiding additional work to be performed by the clerk for avoiding the overflow, is displayed. For example, in a case where the management server 200 detects that money corresponding to the overflow quantity cannot be stored in the collection unit 80 of the back apparatus 100*b*, the guidance information includes information indicating that collection of money from the back apparatus 100*b* to the outside will be required during the collection work. The guidance information may include information that proposes additional work of collecting money in the collection unit 80 of the back apparatus 100*b* to the outside before starting the collection work such that the money corresponding to the over flow quantity can be stored in the collection unit 80.

As described above, the clerk can simulate movement of money by selecting a plurality of front apparatuses 100*a* (first apparatuses) to be sources of the money, a back apparatus 100*b* (second apparatus) to be a destination of the money, and a money collection method for each front apparatus 100*a*.

When money is to be collected from the front apparatuses 100*a* to the back apparatus 100*b*, the clerk can confirm the money storage state of the back apparatus 100*b* after the money collection, before starting the collection work. If an overflow will occur in a storage unit 70 of the back apparatus 100*b* during the collection work, the clerk can know it in advance. If a shortage of change fund for the next day's business will occur in the back apparatus 100*b* after the collection work, the clerk can also know it in advance.

If an overflow or a shortage of money will occur in the back apparatus 100*b*, guidance information indicating the content of additional work for dealing with this problem is displayed on the screen of the display unit 230. The guidance information allows the clerk to perform the addition work such as collecting money from the back apparatus 100*b* in advance to avoid occurrence of an overflow during the collection work, or replenishing the back apparatus 100*b* with money in advance to avoid a shortage of money during the replenishment work for the change funds. The clerk can confirm and deal with the problems, which will occur after moving money, before he/she actually moves money, thereby easily advancing the work of moving money.

If work that cannot be performed by only the clerk is included in the additional work that is guided to the clerk by the management server 200 through the guidance information, the management server 200 can perform a notification process on this additional work. For example, if the additional work can be performed by only a manager of the store, the management server 200 displays, on the display unit 230, information indicating that the clerk cannot perform the work alone, and information to ask the clerk whether or not he/she will make a notification to the manager. When the clerk performs, with the operation unit 220, an operation of selecting a notification to the manager, the management server 200 transmits, to a predetermined communication terminal used by the manager, information indicating that additional work to be performed by the manager will be required in association with the movement of money performed by the clerk. The manager can recognize that the additional work will be required and deal with the additional work, based on the information received in the communication terminal.

For example, when money is to be collected from a plurality of front apparatuses 100*a* to the back apparatus 100*b*, if the quantity of money to be collected exceeds the full quantity of money in a storage unit 70 of the back apparatus 100*b*, an overflow will occur in the back apparatus 100*b*. In this case, the management server 200 displays guidance information that proposes additional work of collecting money from the back apparatus 100*b* in advance. If the additional work of collecting money from the back apparatus 100*b* can be performed only by the manager, the clerk performs a predetermined operation on the operation unit 220, whereby the management server 200 performs a notification process to the communication terminal of the manager. Upon receiving the notification, the manager performs the additional work of collecting money from the back apparatus 100*b*, and thereafter, the clerk can perform the money collection work from the front apparatuses 100*a* to the back apparatus 100*b*.

The guidance information may not necessarily be displayed when the clerk operates the operation unit 220 and presses the warning icon. After the management server 200 has performed the simulation as described by referring to FIG. 5, a warning window including the guidance information may be displayed on the screen shown in FIG. 5 without the operation by the clerk.

Figure 6A:
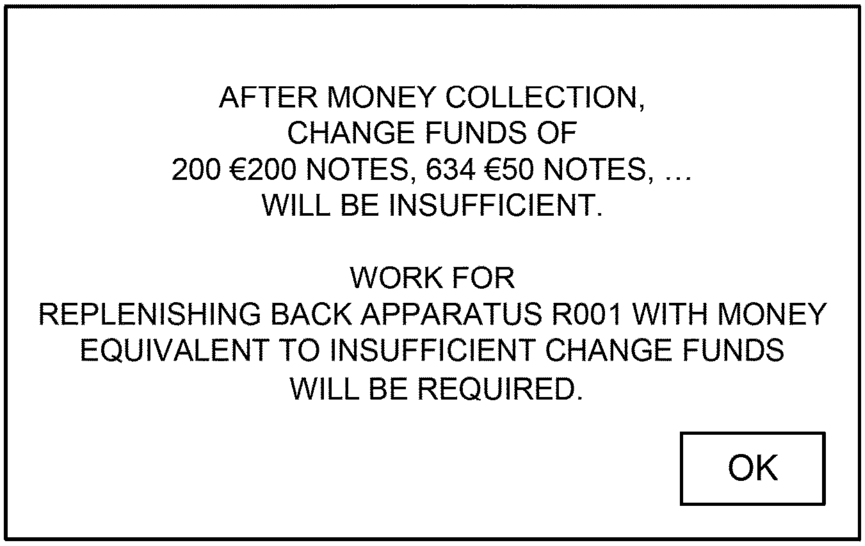
FIGS. 6A and 6B show examples of warning windows.
Figure 6B:
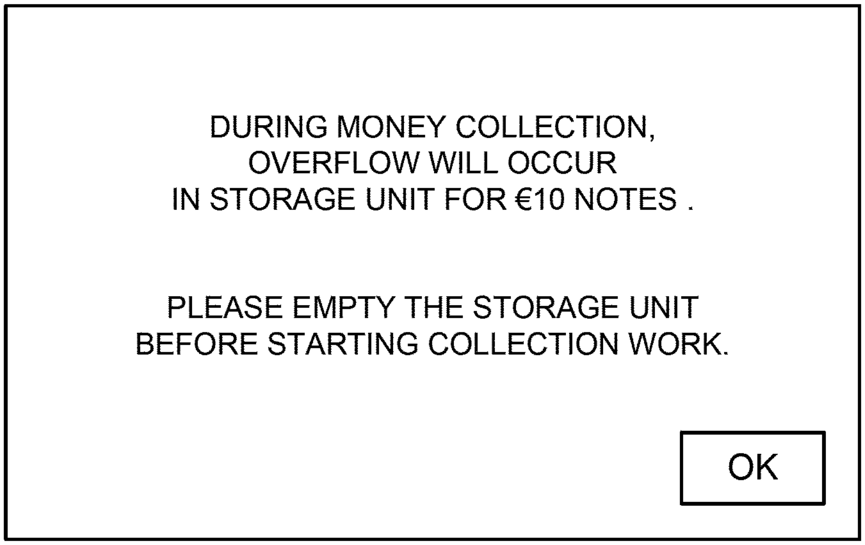

FIGS. 6A and 6B show examples of warning windows. As shown in FIG. 6A, the management server 200 may display information including the denominations and the quantities of money for change funds that will be insufficient in the back apparatus 100*b* after the money collection work, that is, after the process of depositing into the back apparatus 100*b* money collected from the front apparatuses 100*a*, thereby notifying the clerk that additional work of replenishing the back apparatus 100*b* with money equivalent to the insufficient change funds will be required. After confirming the information displayed in the warning window, the clerk presses an OK button to close the warning window, thereby returning to the screen shown in FIG. 5.

If an overflow will occur in a storage unit 70 of the back apparatus 100*b* during the money collection work, the management server 200 may display information indicating this problem and guide the clerk to perform additional work of emptying the storage unit 70 before starting the collection work, as shown in FIG. 6B. That is, the management server 200 may guide the clerk to perform additional work of increasing storage space for money to increase the quantity of money that can be deposited in the back apparatus 100*b*. If the storage units 70 are mountable/dismountable to/from the back apparatus 100*b*, the management server 200 may guide the clerk to perform additional work of preparing an empty storage unit 70 in advance so that the storage unit 70 full of money can be immediately replaced with the empty storage unit 70.

Likewise, in the case where the back apparatus 100*b* includes the collection unit 80, if overflow money, which cannot be stored in any storage unit 70, cannot also be stored in the collection unit 80 during the money collection work, the management server 200 may display information informing this problem, and guide the clerk to perform additional work of emptying the collection unit 80 before starting the collection work. Since the collection unit 80 is mountable/dismountable to/from the back apparatus 100*b*, the management server 200 may guide the clerk to perform additional work of preparing an empty collection unit 80 in advance so that the collection unit 80 full of money can be immediately replaced with the empty collection unit 80.

After the clerk recognizes that a problem such as an overflow of stored money or a shortage of change fund will occur when moving money, the clerk can perform a simulation again by changing the selection of the front apparatuses 100*a* and pressing the calculation button 409 on the screen shown in FIG. 5. Moreover, the clerk can change the money collection method from each front apparatus 100*a*, and/or change the selection of the back apparatus 100*b*. Thus, the clerk can determine a collection method after simulating a variety of collection methods before actually starting the money collection work.

The management server 200 may propose a money collection method. For example, if the combination of the front apparatuses 100*a* and the back apparatus 100*b* selected on the screen shown in FIG. 5 will cause a shortage of change fund after money collection, the management server 200 performs additional simulations after changing the combination of the front apparatuses 100*a* and the back apparatus 100*b*. The management server 200 manages information on money stored in the respective money handling apparatuses 100 installed in the store by using the apparatus information 340 shown in FIG. 4, and therefore can perform simulations with various combinations of the front apparatuses 100*a* and the back apparatus 100*b*. As a result of the simulation, if there is a money collection method that does not cause a shortage of change fund in the back apparatus 100*b*, the management server 200 displays, on the display unit 230, a proposal window including guidance information indicating the money collection method.

Figure 7A:
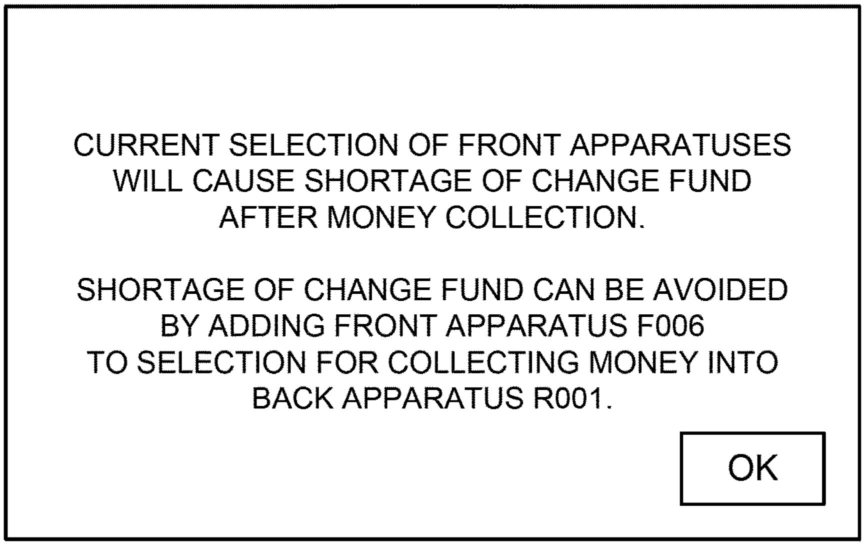
FIGS. 7A and 7B show examples of proposal windows.
Figure 7B:
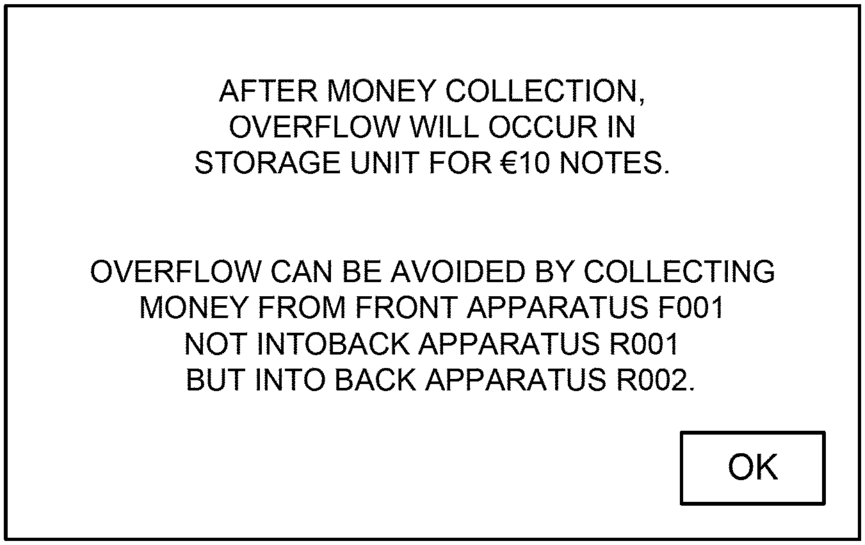

FIGS. 7A and 7B show examples of proposal windows. For example, there is a case where, although a shortage of change fund will occur in the back apparatus 100*b* after the money collection for the group A, if money is collected also from a part of the front apparatuses 100*a* of the group B into the back apparatus 100*b* of the group A, a shortage of change fund can be avoided in the money collections for both the group A and the group B. In this case, the management server 200, which has recognized the above situation through the simulation, displays the proposal window shown in FIG. 7A on the display unit 230. The clerk can determine a money collection method in consideration of the information in the proposal window.

There is a case where occurrence of an overflow of money in the back apparatus 100*b* can be avoided by deselecting a part of the front apparatuses 100*a* that has been selected on the screen shown in FIG. 5, that is, by excluding a part of the front apparatuses 100*a* from the targets of the collection work. For example, there is a case where, although an overflow will occur in the back apparatus 100*b* during money collection for the group A, if money stored in a part of the front apparatuses 100*a* of group A is collected into the back apparatus 100*b* of the group B, an overflow can be avoided in the money collections for both the group A and the group B. In this case, the management server 200, which has recognized the above situation through the simulation, displays the proposal window shown in FIG. 7B on the display unit 230. The clerk can determine a money collection method in consideration of the information in the proposal window.

Next, replenishment work of replenishing front apparatuses 100*a* (second apparatuses) with money dispensed from a back apparatus 100*b* (first apparatus) will be described. In the replenishment work, the front apparatuses 100*a* are replenished with change funds dispensed from the back apparatus 100*b*. The management server 200 can perform a simulation, similar to that for the collection work, for the replenishment work in which change funds are dispensed from the back apparatus 100*b* and the front apparatuses 100*a* are replenished with these change funds. For example, when the clerk operates the operation unit 220 and selects front apparatuses 100*a* to be destinations of money and a back apparatus 100*b* to be a source the of money, the management server 200 performs a simulation and displays a simulation result on the display unit 230. The management server 200 performs the simulation by specifying the denominations and the quantity for each denomination of change funds to be supplied to the respective front apparatuses 100*a*, and the denominations and the quantity for each denomination of money currently stored in the back apparatus 100*b* of the same group as the front apparatus 100*a*, based on the apparatus information 340 shown in FIG. 4. Information on the denominations and the quantity for each denomination of change funds may not necessarily be acquired from the apparatus information 340. The management server 200 may receive the denominations and the quantity for each denomination that are designated by the clerk. For example, the clerk may operate the operation unit 220 of the back apparatus 100*b* and designate the denominations and the quantity for each denomination of change funds.

If the simulation result indicates that a shortage of money will occur in the back apparatus 100*b* during the replenishment work, the management server 200 notifies the clerk of this problem and displays, on the display unit 230, guidance information indicating the content of additional work required for solving the shortage of money.

Figure 8A:
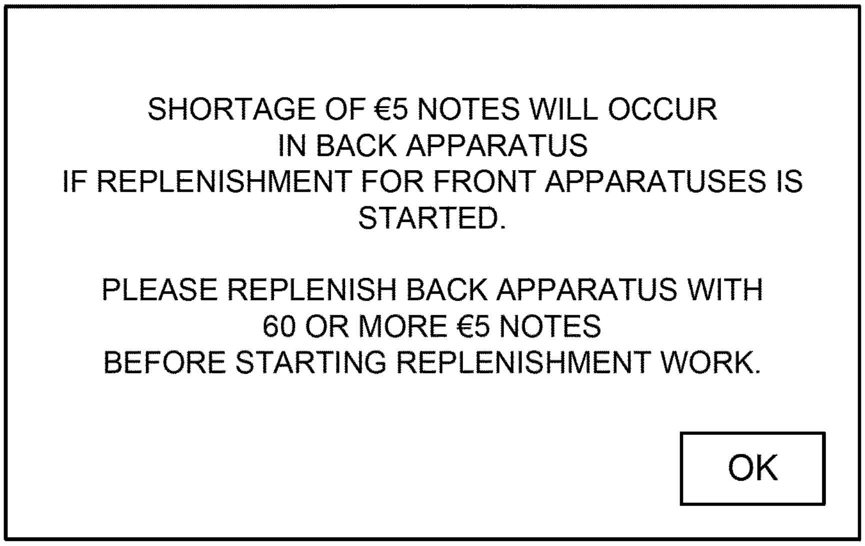
FIGS. 8A and 8B show examples of screens displayed during simulation for replenishment work.
Figure 8B:
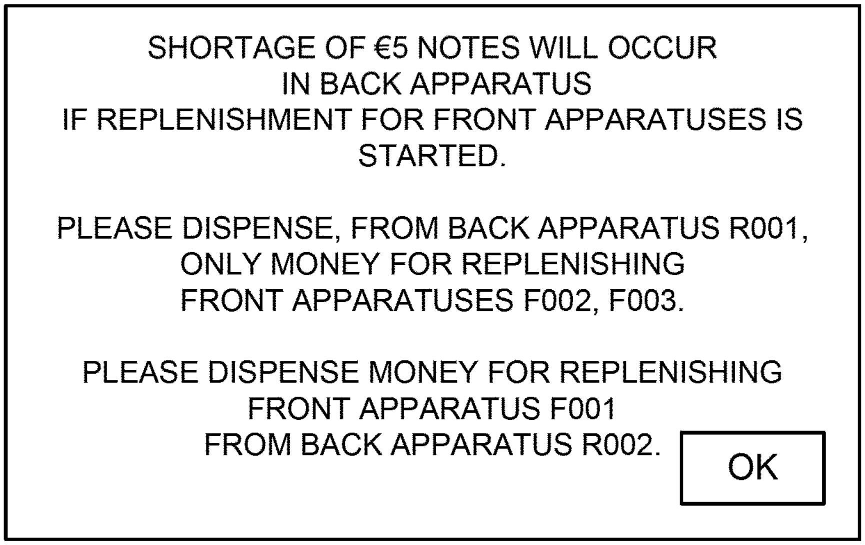

FIGS. 8A and 8B show examples of screens displayed during the simulation of the replenishment work. For example, guidance information shown in FIG. 8A indicates the denomination of money that will be insufficient in the back apparatus 100*b* after the replenishment work is started, and the content of additional work to be performed in advance in order to avoid this insufficiency. That is, the clerk is guided to perform additional work of increasing the quantity of money that can be dispensed from the back apparatus 100*b* as a source of money for replenishment before starting the replenishment work. The clerk replenishes the back apparatus 100*b* with money in advance based on the guidance information, thereby easily advancing the money replenishment work for the front apparatuses 100*a* without interruption of the money replenishment work.

If only the manager is permitted to perform the additional work of replenishing the back apparatus 100*b* with money, the management server 200 can transmit a notification for asking the manager to perform the additional work, to the communication terminal of the manager, in response to an operation performed by the clerk, as in the case of the simulation for the collection work. The manager, having received the notification to the communication terminal, performs the additional work of replenishing the back apparatus 100*b* with money, and thereafter, the clerk can perform the money replenishment work from the back apparatus 100*b* to the front apparatuses 100*a*.

There is a case where a shortage of money in the back apparatus 100*b* can be avoided by deselecting a part of the front apparatuses 100*a* that has been selected on the screen in the same way as that shown in FIG. 5, that is, by excluding a part of the front apparatuses 100*a* from the targets of the replenishment work. For example, there is a case where, although a shortage of money will occur in the back apparatus 100*b* during money replenishment for the group A, if a part of the front apparatuses 100*a* is replenished with money dispensed from the back apparatus 100*b* of the group B, a shortage of money can be avoided in the money for both the group A and the group B. In this case, the management server 200, which has recognized the above situation through the simulation based on the apparatus information 340, displays a proposal window on the display unit 230 as shown in FIG. 8B. The proposal window includes information indicating that a shortage of money will occur in the back apparatus 100*b* in the group A during the replenishment work, and information indicating a method for avoiding the shortage of money. Thus, the clerk can determine a money replenishment method in consideration of the information in the proposal window.

Figure 9:
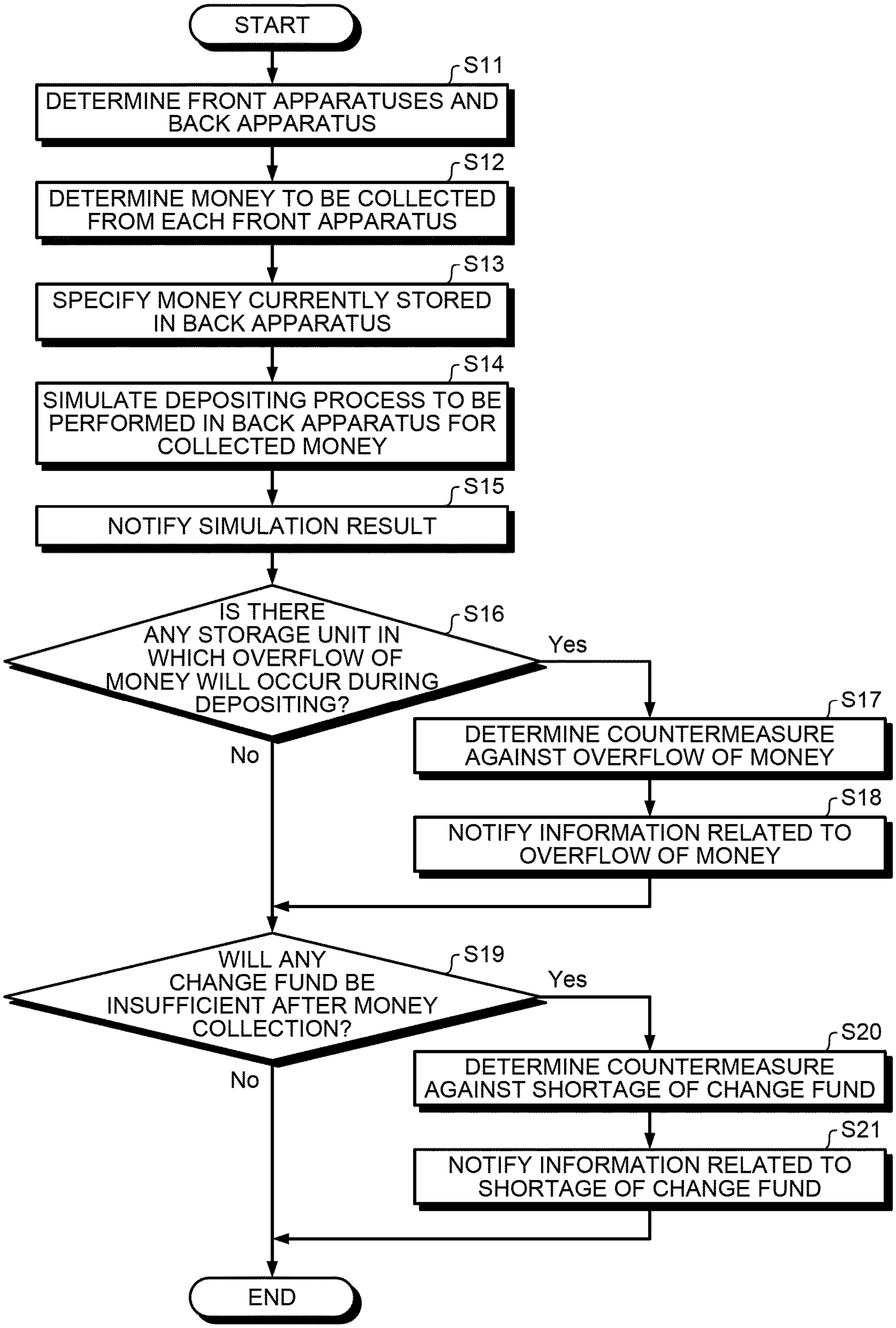
FIG. 9 is a flowchart showing a flow of a process performed before start of the collection work.

Next, the flow of processes will be described. FIG. 9 is a flowchart showing the flow of a process to be performed before starting the collection work. The management server 200 determines front apparatuses 100*a* (first apparatuses) to be sources of money to be collected, and a back apparatus 100*b* (second apparatus) to be a destination of the collected money (step S11).

The front apparatuses 100*a* and the back apparatus 100*b* may be determined based on an operation performed on the operation unit 220 by the clerk as described above, or may be determined by the management server 200. For example, the management server 200 may detect a front apparatus 100*a* in which the quantity of money stored in a storage unit 70 has reached the collection threshold based on the apparatus information 340 shown in FIG. 4, and may determine this front apparatus 100*a* as a collection source while determining a back apparatus 100*b* belonging to the same group as this front apparatus 100*a*, as a collection destination. At this time, the management server 200 may determine all the front apparatuses 100*a* belonging to the same group as the detected front apparatus 100*a*, as collection sources. If there is only one back apparatus 100*b*, this back apparatus 100*b* and the front apparatuses 100*a* belonging to the same group as this back apparatus 100*b* are automatically selected.

The management server 200 determines money to be collected from each front apparatus 100*a* (step S12). The money to be collected may be determined based on the operation performed on the operation unit 220 by the clerk as described above, or may be determined by the management server 200. For example, either "full collection" or "residue collection" may be set for each front apparatus 100*a* in advance, and the management server 200 may determine money to be collected, based on the setting.

The management server 200 specifies money stored in each of the storage units 70 of the back apparatus 100*b* based on the apparatus information 340 shown in FIG. 4 (step S13). The management server 200 simulates a depositing process to be performed in the back apparatus 100*b*, based on information on money currently stored in the back apparatus 100*b*, and information on money to be collected from the front apparatuses 100*a* (step S14). That is, the management server 200 simulates how the money storage state of the back apparatus 100*b* changes when the money collected from the respective front apparatuses 100*a* is deposited in the back apparatus 100*b*. The management server 200 notifies a simulation result (step S15). The notification process is performed as described in FIG. 5, for example.

When it is confirmed based on the simulation result that the collection work will not cause an overflow in any storage unit 70 of the back apparatus 100*b* (step S16; No), the management server 200 proceeds to next step S19. Meanwhile, when it is found that an overflow will occur in any of the storage units 70 of the back apparatus 100*b* during the collection work (step S16; Yes), the management server 200 determines a countermeasure against the overflow (step S17). The management server 200 notifies the clerk of information on the overflow and the countermeasure (step S18). The notification process is performed as described in FIG. 5, FIG. 6B, or FIG. 7B, for example. In the notification, the clerk may be guided to perform additional work of increasing the quantity of money that can be deposited in the back apparatus 100*b*. In this case, the additional work is for increasing storage space of money in the back apparatus 100*b* so that money collected from all the front apparatuses 100*a* can be deposited in the back apparatus 100*b*. In the notification, the clerk may be guided to perform additional work of excluding a part of the front apparatuses 100*a* from the targets of the collection work. In this case, the additional work is for decreasing money to be deposited in the back apparatus 100*b* so that money collected from all the front apparatuses 100*a* can be deposited in the back apparatus 100*b*.

After the management server 200 specified, based on the simulation result, the money storage state of the back apparatus 100*b* after the money collection, the management server 200 specifies change funds to be dispensed from the back apparatus 100*b* for the next day's business, based on the apparatus information 340 shown in FIG. 4. In a case where the money storage state of the back apparatus 100*b* indicates that change funds for all the front apparatuses 100*a* belonging to the same group as the back apparatus 100*b* can be dispensed from the back apparatus 100*b* after the money collection, the management server 200 ends the process (step S19; No). In a case where the money storage state of the back apparatus 100*b* indicates that a shortage of money for the change funds will occur in the back apparatus 100*b* after the money collection (step S19; Yes), the management server 200 determines a countermeasure against the shortage of money for the change funds (step S20). The management server 20 notifies the clerk of information on the shortage of money and the countermeasure (step S21). The notification process is performed as described in FIG. 5, FIG. 6A, or FIG. 7A, for example. In the notification process, the clerk is guided to perform additional work of replenishing the back apparatus 100*b* with money equivalent to the shortage or additional work of adding a front apparatus 100*a* to be a target of the collection work. In this case, the additional work is for increasing money to be stored in the back apparatus 100*b* after the money collection so that change funds can be dispensed for all the front apparatuses 100*a* from the back apparatus 100*b*.

In the money handling system 1, when it is found that the overflow will occur in any of the storage units 70 of the back apparatus 100*b* during the collection work, it can be set that the front apparatuses 100*a* does not dispense money to be collected therefrom until the predetermined operation is performed in the money handling system 1 by the clerk. For example, the management sever 200 controls the front apparatuses 100*a* so that the money to be collected is not dispensed therefrom until the clerk performs a predetermined operation indicating that the clerk confirmed the occurrence of the overflow and/or the clerk determined to make the front apparatuses 100*a* dispense the money to be collected even when the overflow occurs. In this case, after the management server 200 detects that the clerk has performed the predetermined operation, the management server 200 allows the front apparatuses 100*a* to dispense the money to be collected therefrom. For another example, the management sever 200 controls the front apparatuses 100*a* so that the money to be collected is not dispensed therefrom until the clerk performs the additional work proposed by the management server 200. In this case, after the management server 200 detects that the additional work has been performed and the money to be collected from all the front apparatuses 100*a* can be deposited in the back apparatus 100*b*, the management server 200 allows the front apparatuses 100*a* to dispense the money to be collected therefrom.

Figure 10:
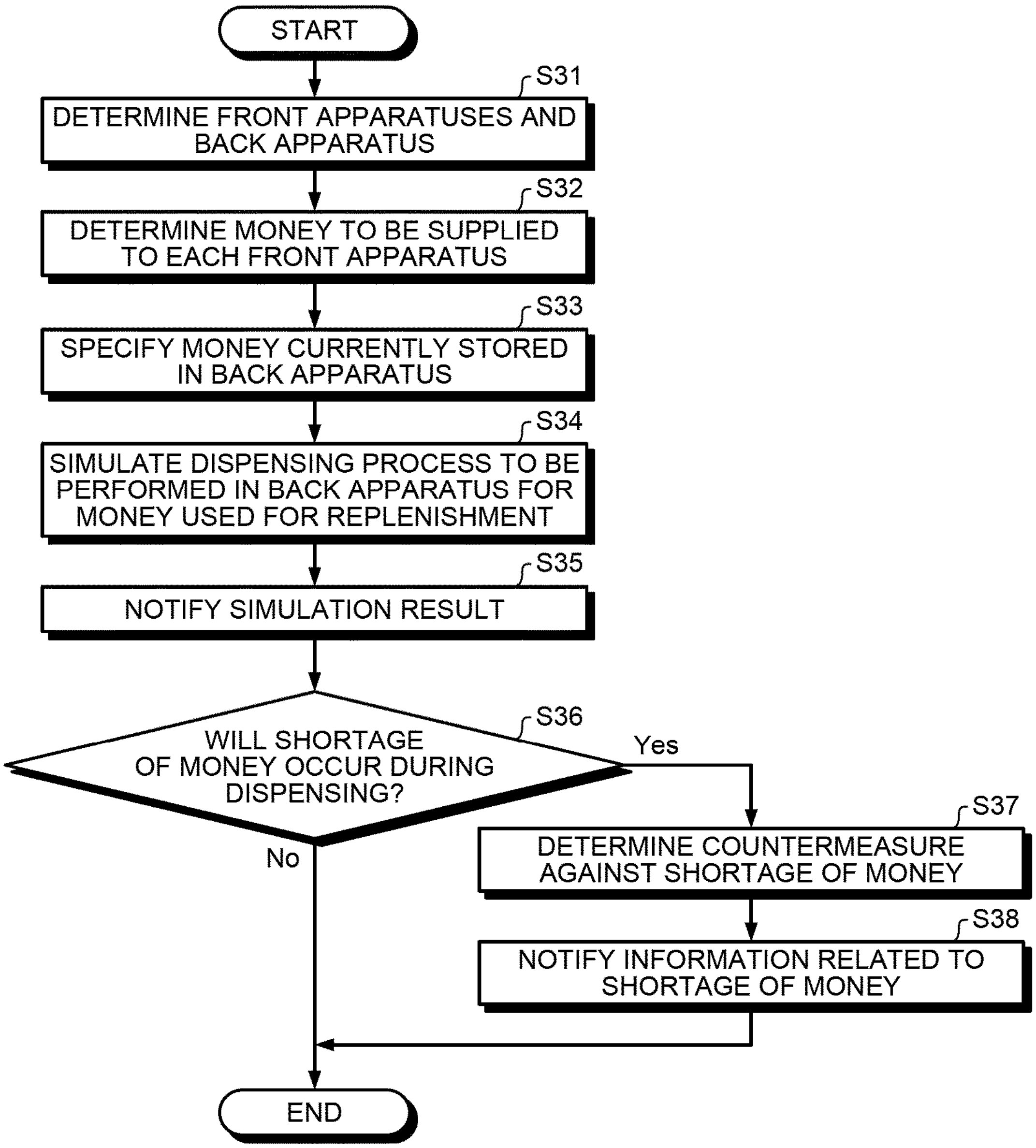
FIG. 10 is a flowchart showing a flow of a process performed before start of the replenishment work.

FIG. 10 is a flowchart showing the flow of a process to be performed before the replenishment work. The management server 200 determines a back apparatus 100*b* (first apparatus) to be a source of money for replenishment, and front apparatuses 100*a* (second apparatuses) to be replenished with the money (step S31).

The front apparatuses 100*a* and the back apparatus 100*b* may be determined based on an operation performed on the operation unit 220 by the clerk as described above, or may be determined by the management server 200. For example, the management server 200 may detect a front apparatus 100*a* in which the quantity of money stored in any of the storage units 70 has reached the replenishment threshold, based on the apparatus information 340 shown in FIG. 4, and may determine this front apparatus 100*a* as a replenishment destination while determining a back apparatus 100*b* belonging to the same group as this front apparatus 100*a*, as a replenishment source. At this time, the management server 200 may determine all the front apparatuses 100*a* belonging to the same group as the detected front apparatus 100*a*, as replenishment destinations. If there is only one back apparatus 100*b*, this back apparatus 100*b* and front apparatuses 100*a* belonging to the same group as this back apparatus 100*b* are automatically selected.

The management server 200 determines money to be supplied to each front apparatus 100*a* (step S32). The money for replenishment may be determined based on an operation performed on the operation unit 220 by the clerk, or may be determined by the management server 200. For example, the management server 200 may determine the denominations and the quantity for each denomination of money for replenishment such that the quantity of money stored in each storage unit 70 of each front apparatus 100*a* matches the quantity of the change fund. That is, the money to be supplied to each front apparatus 100*a* may be determined based on information on the quantity of change in the apparatus information 340.

The management server 200 specifies money stored in each storage unit 70 of the back apparatus 100*b*, based on the apparatus information 340 shown in FIG. 4 (step S33). The management server 200 simulates a dispensing process to be performed in the back apparatus 100*b*, based on information on money currently stored in the back apparatus 100*b*, and information on money to be supplied to the front apparatuses 100*a* (step S34). That is, the management server 200 simulates how the money storage state of the back apparatus 100*b* changes when the money to be supplied to the respective front apparatuses 100*a* is dispensed from the back apparatus 100*b*. The management server 200 notifies a simulation result (step S35). The notification process is performed as described in FIG. 5, for example.

When it is confirmed based on the simulation result that the replenishment work will not cause a shortage of money in any of the storage units 70 of the back apparatus 100*b* (step S36; No), the management server 200 ends the process. Meanwhile, when it is found that a shortage of money will occur in any of the storage units 70 in the back apparatus 100*b* during the replenishment work (step S36; Yes), the management server 200 determines a countermeasure against the shortage of money (step S37). The management server 20 notifies the clerk of information on the shortage of money and the countermeasure (step S38). The notification process is performed as described in FIGS. 8A and 8B, for example. In the notification, the clerk may be guided to perform additional work of increasing the quantity of money that can be dispensed from the back apparatus 100*b*. In this case, the additional work is for increasing money to be stored in the back apparatus 100*b* so that the money to be supplied to all the front apparatuses 100*a* can be dispensed from the back apparatus 100*b*. In the notification, the clerk may be guided to perform additional work of excluding a part of the front apparatuses 100*a* from the targets of the replenishment work. In this case, the additional work is for decreasing money to be dispensed from the back apparatus 100*b* so that the money to be supplied to all the front apparatuses 100*a* can be dispensed from the back apparatus 100*b*.

In the money handling system 1, when it is found that the shortage of money will occur in any of the storage units 70 of the back apparatus 100*b* during the replenishment work, it can be set that the back apparatuses 100*b* does not dispense the money for replenishment until the predetermined operation is performed in the money handling system 1 by the clerk. For example, the management sever 200 controls the back apparatuses 100*b* so that the money for replenishment is not dispensed therefrom until the clerk performs a predetermine operation indicating that the clerk confirmed the occurrence of the shortage and/or the clerk determined to make the back apparatus 100*b* dispense the money for replenishment even when the shortage of money occurs. In this case, after the management server 200 detects that the clerk has performed the predetermined operation, the management server 200 allows the back apparatuses 100*b* to dispense the money for replenishment. For another example, the management sever 200 controls the back apparatuses 100*b* so that the money for replenishment is not dispensed therefrom until the clerk performs the additional work proposed by the management server 200. In this case, after the management server 200 detects that the additional work is performed and the money for replenishment can be dispensed for all the front apparatuses 100*a* from the back apparatus 100*b*, the management server 200 allows the back apparatuses 100*a* to dispense the money for replenishment.

In the present embodiment, the clerk performs an operation on the operation unit 220 of the management server 200, and the screens shown in FIG. 5 to FIG. 8B are displayed on the display unit 230 of the management server 200. However, the operation unit and the display unit used by the clerk are not limited thereto. For example, the clerk may use the operation unit 120 and the display unit 130 of the front apparatus 100*a* or the operation unit 120 and the display unit 130 of the back apparatus 100*b* for the operations described above. Alternatively, the clerk may use an operation unit and a display unit of a communication terminal that is communicably connected to the management server 200.

In one aspect, collection and replenishment of money are performed between the plurality of money handling apparatuses 100. However, in one aspect, only one of collection and replenishment may be performed between the plurality of money handling apparatuses 100. Not all the processes described above are necessarily performed in the money handling system 1, and only a part of the processes may be performed in the money handling system 1. For example, the management server 200 may manage only a part of the information shown in FIG. 4 while the remaining information is acquired from the money handling apparatuses 100. The management server 200 may display only a part of the information displayed on the screen shown in FIG. 5. The management server 200 may not necessarily perform the processes in steps S19 to S21 among the processes shown in FIG. 9.

In one aspect, the case of moving money between the front apparatuses 100*a* installed in the front area of the store and the back apparatus 100*b* installed in the back office of the store has been mainly described. However, movement of money is not limited to that performed between the front area and the back office. Money may be moved between one front apparatus 100*a* and a plurality of other front apparatuses 100*a*. For example, front apparatuses 100*a* may be selectable in the frame 400 of the screen shown in FIG. 5. When a front apparatus 100*a* implements the aforementioned functions and operations of the back apparatus 100*b*, money can also be moved between front apparatuses 100*a* as described above.

Figure 11:
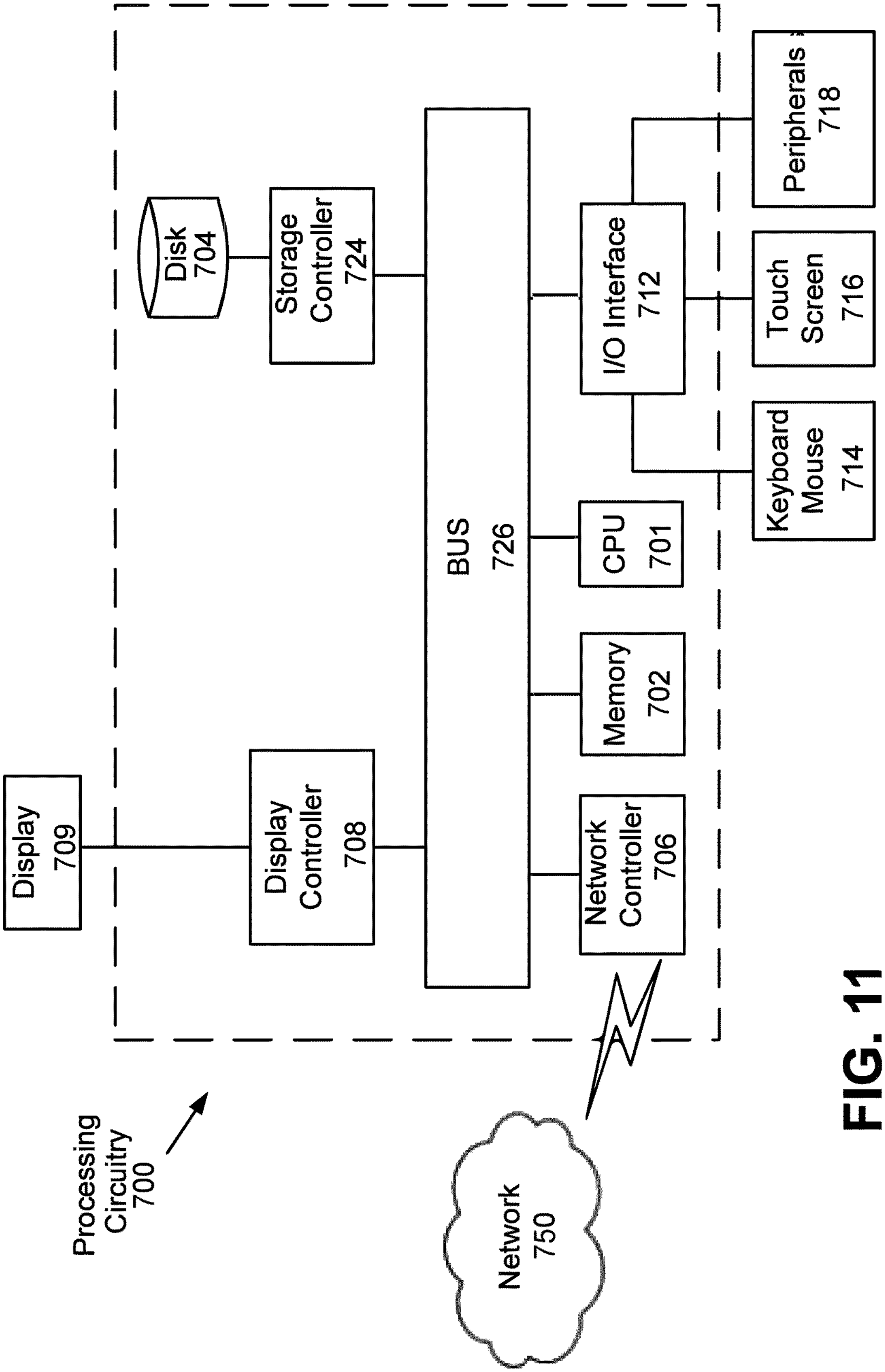
FIG. 11 is a block diagram of processing circuitry that performs computer-based operations in accordance with the present disclosure.

FIG. 11 is a block diagram of processing circuitry that performs computer-based operations in accordance with the present disclosure. FIG. 11 illustrates processing circuitry 700 which is included in or encompasses control unit 110, which is a component of money handling apparatus 100. Additionally, processing circuitry 700 which is included in or encompasses control unit 210, which is a component of management server 200.

Processing circuitry 700 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 11, the processing circuitry 700 includes a CPU 701 which performs one or more of the control processes discussed in this disclosure. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 700 communicates, such as a server or computer. The processes may also be stored in network based storage, cloud-based storage or other mobile accessible storage and executable by processing circuitry 700.

Further, the claimed advancements may be provided as a utility application, background daemon, or component of an operating system, or combination thereof, executing in conjunction with CPU 701 and an operating system such as Microsoft Windows, UNIX, Solaris, LINUX, Apple MAC-OS, Apple iOS and other systems known to those skilled in the art.

The hardware elements in order to achieve the processing circuitry 700 may be realized by various circuitry elements. Further, each of the functions of the above described embodiments may be implemented by circuitry, which includes one or more processing circuits. A processing circuit includes a particularly programmed processor, for example, processor (CPU) 701, as shown in FIG. 11. A processing circuit also includes devices such as an application specific integrated circuit (ASIC) and conventional circuit components arranged to perform the recited functions.

In FIG. 11, the processing circuitry 700 may be a computer or a particular, special-purpose machine. Processing circuitry 700 is programmed to execute processing to control terminal device 10/server device 20.

Alternatively, or additionally, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The processing circuitry 700 in FIG. 11 also includes a network controller 706, such as an Ethernet PRO network interface card, for interfacing with network 750. As can be appreciated, the network 750 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 750 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 706 may be compliant with other direct communication standards, such as Bluetooth, a near field communication (NFC), infrared ray or other.

The processing circuitry 700 further includes a display controller 708, such as a graphics card or graphics adaptor for interfacing with display 709, such as a monitor. An I/O interface 712 interfaces with a keyboard and/or mouse 714 as well as a touch screen panel 716 on or separate from display 709. I/O interface 712 also connects to a variety of peripherals 718.

The storage controller 724 connects the storage medium disk 704 with communication bus 726, which may be an ISA, EISA, VESA, PCI, or similar, for interconnecting all of the components of the processing circuitry 700. A description of the general features and functionality of the display 709, keyboard and/or mouse 714, as well as the display controller 708, storage controller 724, network controller 706, and I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A money handling method according to one aspect of the present disclosure is a method performed by an information processing apparatus in a money handling system including a plurality of money handling apparatuses and the information processing apparatus. The money handling method includes: determining a denomination and quantity of money to be moved between the plurality of money handling apparatuses; performing a simulation, based on the determined denomination and quantity of money, money handling processes to be performed for moving the money between the respective apparatuses; performing a determination, based on a result of the simulation, whether or not all the money can be moved between the respective apparatuses; and notifying a result of the determination.

In the above method, in the simulation, a first money handling process of collecting money from a first apparatus that is a source of the money, and a second money handling process of depositing the money collected from the first apparatus into a second apparatus that is a destination of the money, are simulated. In the determination, whether or not all the collected money can be deposited into the second apparatus is determined. The method may further include providing guidance for additional work for enabling depositing of all the collected money when a result of the determination indicates that not all the collected money can be deposited into the second apparatus.

In the above method, the additional work may be work of increasing the quantity of money that can be deposited into the second apparatus.

In the above method, the additional work may be work of excluding at least one of a plurality of first apparatuses from targets of collection work.

In the above method, in the simulation, a first money handling process of dispensing money from a first apparatus that is a source of money for replenishment, and a second money handling process of replenishing a second apparatus that is a destination of the money for replenishment with the money dispensed from the first apparatus, are simulated. In the determination, whether or not all the money for replenishment can be dispensed from the first apparatus is determined. The method may further include providing guidance for additional work for enabling dispensing of all the money for replenishment when a result of the determination indicates that not all the money for replenishment can be dispensed from the first apparatus.

In the above method, the additional work may be work of increasing the quantity of money that can be dispensed from the first apparatus.

In the above method, the additional work may be work of excluding at least one of a plurality of second apparatuses from targets of replenishment work.

In the above method, in a case where an approval of a manager is required for performing the additional work, the money handling method may further include a notifying a terminal device used by the manager that the additional work is required.

A money handling system according to one aspect of the present disclosure includes: a plurality of money handling apparatuses each configured to execute a money handling process; and an information processing apparatus configured to determine a denomination and quantity of money to be moved between the respective apparatuses, simulate money handling processes for moving the money between the respective apparatuses, based on the determined denomination and quantity of the money, determine whether or not all the money can be moved between the respective apparatuses and notify a result of the determination.

According to the money handling method and the money handling system of the present disclosure, before money is actually moved between a plurality of money handling apparatuses, a money handling process to be performed during the movement is simulated to confirm whether or not money can be moved between the apparatuses. Thus, the work of moving money can be facilitated.

The components of the money handling system 1 according to the present embodiment are conceptually functional components, and thus may not necessarily be physically limited thereto. For example, a money handling apparatus 100 included in the money handling system 1 may implement a part or the entirety of the function of the management server 200 described above. That is, distributed or integrated forms of each device are not limited to the forms illustrated in the drawings, and all or some of the forms may be distributed or integrated functionally or physically in any unit depending on various loads, use statuses, or the like.

As described above, in the money handling system according to the present embodiment, when money is to be moved between a plurality of money handling apparatuses, it can be confirmed in advance whether or not the movement of money can be smoothly performed, through a simulation of a money handling processes to be performed by these money handling apparatuses. If simulation result indicates that a problem to be dealt with by a user, such as an overflow of money in a storage unit during a depositing process or a shortage of money in a storage unit during a dispensing process, will occur before the movement of money is completed, the user can find this problem in advance. The money handling system can propose, to the user, a method for avoiding occurrence of the problem found in the simulation result, or provide the user with guidance information that provides a countermeasure to be taken for the problem. Thus, the user can easily perform the money moving work.

As described above, the money handling method and the money handling system according to the present disclosure are useful in easily performing work of moving money between a plurality of money handling apparatuses.

What is claimed is:

1. A money handling method performed by an information processing apparatus in a money handling system including a plurality of money handling apparatuses and the information processing apparatus, the method comprising:

determining a denomination and quantity of money to be moved between a single money handling apparatus and a plurality of money handling apparatuses;

performing a simulation, based on the determined denomination and quantity of money, of money handling processes to be performed for moving the money between the single money handling apparatus and the plurality of money handling apparatuses;

performing a determination, based on a result of the simulation, whether or not all the money can be moved between the respective apparatuses and change funds including a plurality of denominations of money set for the plurality of money handling apparatuses can be dispensed from the single money handling apparatus after performing the movement of the money; and notifying a result of the determination wherein storage states of respective storage units in the single money handling apparatus after moving the money to/from the plurality of money handling apparatuses are graphically displayed on a display, and in a case where there is a storage unit in the single money handling apparatus in which a shortage of a denomination of money from a predetermined quantity of money set for each denomination to dispense the change funds from the single money handling apparatus or an overflow of money from a full quantity set for the storage unit will occur after moving the money, the storage unit is displayed with a predetermined mark to notify the shortage or the overflow;

wherein after a user starts operation on movement of the money on a screen of the information processing apparatus, information on the single money handling apparatus and the plurality of money handling apparatuses, which are targets of the movement of the money, a moving method of the money set for each of the plurality of money handling apparatuses, and a button for starting the simulation are displayed on the screen, and a first simulation based on contents displayed on the screen is started after the user operates the button on the screen, and wherein in a case where a result of the first simulation indicates occurrence of the shortage or the overflow of money after the money is moved between the single apparatus and the plurality of money handling apparatuses, the method further includes:

receiving, from the user input to change the plurality of money handling apparatuses set as the targets of the movement of the money and/or the moving method set for each target apparatus in the contents displayed on the screen for the first simulation and an operation of the button for starting a second simulation based on the changed contents to find a condition to avoid the occurrence of the shortage and the overflow;

performing the second simulation; and notifying the user of a result of the second simulation, and wherein the condition to avoid the shortage and the overflow is identified by performing one or more simulations before moving the money between the single money handling apparatus and the plurality of money handling apparatuses.

2. The money handling method according to claim 1, wherein in the simulation, a first money handling process of collecting money from the plurality of money handling apparatuses that are sources of the money, and a second money handling process of depositing the money collected from the plurality of money handling apparatuses into the single money handling apparatus that is a destination of the collected money, are simulated, in the determination, whether or not all the collected money can be deposited into the single money handling apparatus is determined, and the method further includes providing guidance for additional work to be performed before starting the movement of the money, for enabling depositing of all the collected money into the single money handling apparatus in a case that the result of the determination indicates that not all the collected money can be deposited into the single money handling apparatus.

3. The money handling method according to claim 2, wherein the additional work is for increasing the quantity of money, which can be deposited into the single money handling apparatus, before starting the movement of the money.

4. The money handling method according to claim 2, wherein the additional work is for excluding at least one of the plurality of money handling apparatuses from targets of collection work.

5. The money handling method according to claim 1, wherein in the simulation, a first money handling process of dispensing money set as the change funds from the single money handling apparatus that is a source of money for replenishment, and a second money handling process of replenishing the plurality of money handling apparatuses that are destinations of the money for replenishment, with the money dispensed as the change funds from the single money handling apparatus, are simulated, in the determination, whether or not all the money set as the change funds can be dispensed from the single money handling apparatus is determined, and the method further includes providing guidance for additional work to be performed before starting the movement of the money, for enabling dispensing of all the money set as the change funds from the single money handling apparatus in a case that a result of the determination indicates that not all the money set as the change funds can be dispensed from the single money handling apparatus.

6. The money handling method according to claim 5, wherein the additional work is for increasing the quantity of money, which can be dispensed from the single money handling apparatus, before starting the dispense of the money set as the change funds.

7. The money handling method according to claim 5, wherein the additional work is for excluding at least one of the plurality of money handling apparatuses from targets of replenishment work for the change funds.

8. The money handling method according to claim 2, wherein in a case where an approval of a manager is required for performing the additional work, the method further includes notifying a terminal device used by the manager that the additional work is required.

9. A money handling system, comprising:

a plurality of money handling apparatuses each configured to perform a money handling process;

processing circuitry configured to determine, when money is to be moved between a single money handling apparatus and a plurality of money handling apparatuses, a denomination and quantity of money to be moved between the respective apparatuses, simulate money handling processes to be performed for moving the money between the respective apparatuses, based on the determined denomination and quantity of the money, determine whether or not all the money can be moved between the single money handling apparatus and the plurality of money handling apparatuses and change funds including a plurality of denominations of money set for the plurality of money handling apparatuses can be dispensed from the single money handling apparatus after performing the movement of the money, and notify a result of the determination; and a display that graphically displays storage states of respective storage units in the single money handling apparatus after moving the money to/from the plurality of money handling apparatuses, wherein in a case where there is a storage unit in the single money handling apparatus in which a shortage of a denomination of money from a predetermined quantity of money set for each denomination to dispense the change funds from the single money handling apparatus or an overflow of money from a full quantity set for the storage unit will occur after moving the money, the storage unit is displayed with a predetermined mark to notify the shortage or the overflow, wherein after a user starts operation on movement of the money, information on the single money handling apparatus and the plurality of money handling apparatuses, which are targets of the movement of the money, a moving method of the money set for each of the plurality of money handling apparatuses, and a button for starting a first simulation are displayed on a screen of the display, the first simulation is started based on contents displayed on the screen after the user operates the button on the screen, and wherein in a case where a result of the first simulation indicates occurrence of the shortage or the overflow of money after the money is moved between the single apparatus and the plurality of money handling apparatuses, the processing circuitry receives, from the user, input to changes the plurality of money handling apparatuses set as the targets of the movement of the money and/or the moving method set for each target apparatus in the contents displayed on the screen for the first simulation, receives an operation of the button for starting a second simulation, and performs the second simulation based on the changed contents to find a condition to avoid the occurrence of the shortage and the overflow, and notifies the user of a result of the second simulation, and the processing circuitry identifies the condition to avoid the occurrence of the shortage and the overflow by performing one or more simulations before moving the money between the single money handling apparatus and the plurality of money handling apparatuses.

10. The money handling system according to claim 9, wherein the processing circuitry is further configured to simulate a first money handling process of collecting money from the plurality of money handling apparatuses that are sources of the money, and a second money handling process of depositing the money collected from the plurality of money handling apparatuses into the single money handling apparatus that is a destination of the collected money, and provide guidance for additional work to be performed before starting the movement of the money, for enabling depositing of all the collected money into the single money handling apparatus, in response to the result of the determination indicating that not all the collected money can be deposited into the single money handling apparatus.

11. The money handling system according to claim 10, wherein the additional work increases the quantity of money, which can be deposited into the single money handling apparatus, before starting the movement of the money.

12. The money handling system according to claim 10, wherein the additional work excludes at least one of the plurality of money handling apparatuses from targets of collection work.

13. The money handling system according to claim 9, wherein the processing circuitry is further configured to simulate a first money handling process of dispensing money set as the change funds from the single money handling apparatus that is a source of money for replenishment, and a second money handling process of replenishing the plurality of money handling apparatuses that are destinations of the money for replenishment, with the money dispensed set as the change funds from the single money handling apparatus, and provide guidance for additional work to be performed before starting the movement of the money, for enabling dispensing of all the money set as the change funds from the single money handling apparatus in response to a result of the determination indicates that not all the money set as the change funds can be dispensed from the single money handling apparatus.

14. The money handling system according to claim 13, wherein the additional work increase the quantity of money, which can be dispensed from the single money handling apparatus, before starting the movement of the money set as the change funds.

15. The money handling system according to claim 13, wherein the additional work excludes at least one of the plurality of money handling apparatuses from targets of replenishment work.

16. The money handling system according to claim 10, wherein in a case where an approval of a manager is required for performing the additional work, the processing circuitry is further configured to notify a terminal device used by the manager that the additional work is required.

17. The money handling method according to claim 1, wherein in a case where the simulation is performed for the money to be collected from the plurality of money handling apparatuses and stored in the single money handling apparatus, a collection method for each of the plurality of money handling apparatuses is selected from among a plurality of collection methods including a first collection method for collecting all money from the money handling apparatus and a second collection method in which a part of the money is collected while remaining money is left in the money handling apparatus.

18. The money handling method according to claim 1, further comprising:

receiving a selection of a money handling apparatus; and selecting a group including the selected money handling apparatus, from among groups each of which groups a single money handling apparatus and a plurality of money handling apparatuses;

wherein the simulation is performed for the selected group, and in a case where all the money cannot be moved between the single money handling apparatus and the plurality of money handling apparatuses that are in the same group, the method further comprising performing another simulation for moving the money between money handling apparatuses in different groups in order to determine a money moving method by which the shortage and the overflow of the money do not occur in both of the groups, and notifying information on the money moving method.

* * * * *